(12) United States Patent
Chechik et al.

(10) Patent No.: US 11,470,042 B2
(45) Date of Patent: Oct. 11, 2022

(54) DISCOVERING EMAIL ACCOUNT COMPROMISE THROUGH ASSESSMENTS OF DIGITAL ACTIVITIES

(71) Applicant: Abnormal Security Corporation, San Francisco, CA (US)

(72) Inventors: Dmitry Chechik, San Carlos, CA (US); Umut Gultepe, Sausalito, CA (US); Raphael Kargon, San Francisco, CA (US); Jeshua Alexis Bratman, Brooklyn, NY (US); Cheng-Lin Yeh, Menlo Park, CA (US); Sanny Xiao Lang Liao, San Francisco, CA (US); Erin Elisabeth Edkins Ludert, San Francisco, CA (US); Sanjay Jeyakumar, Berkeley, CA (US); Hariank Muthakana, Sterling, VA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 17/094,801

(22) Filed: Nov. 10, 2020

(65) Prior Publication Data
US 2021/0266294 A1     Aug. 26, 2021

Related U.S. Application Data

(63) Continuation-in-part of application No. 16/888,129, filed on May 29, 2020, now Pat. No. 10,911,489.
(Continued)

(51) Int. Cl.
*G06F 15/16* (2006.01)
*H04L 9/40* (2022.01)
(Continued)

(52) U.S. Cl.
CPC ........ *H04L 63/0236* (2013.01); *H04L 51/212* (2022.05); *H04L 51/222* (2022.05);
(Continued)

(58) Field of Classification Search
CPC ..... H04L 63/0236; H04L 51/12; H04L 51/20; H04L 63/102; H04L 63/105; H04L 63/1433
(Continued)

(56) References Cited

U.S. PATENT DOCUMENTS

| | | | |
|---|---|---|---|
| 6,088,717 A | 7/2000 | Reed | |
| 7,263,506 B2 | 8/2007 | Lee et al. | |

(Continued)

FOREIGN PATENT DOCUMENTS

CN     107315954     11/2017

OTHER PUBLICATIONS

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

(Continued)

*Primary Examiner* — Imad Hussain
(74) *Attorney, Agent, or Firm* — Van Pelt, Yi & James LLP

(57) ABSTRACT

Introduced here are threat detection platforms designed to discover possible instances of email account compromise in order to identify threats to an enterprise. In particular, a threat detection platform can examine the digital activities performed with the email accounts associated with employees of the enterprise to determine whether any email accounts are exhibiting abnormal behavior. Examples of digital activities include the reception of an incoming email, transmission of an outgoing email, creation of a mail filter, (Continued)

and occurrence of a sign-in event (also referred to as a "login event"). Thus, the threat detection platform can monitor the digital activities performed with a given email account to determine the likelihood that the given email account has been compromised.

36 Claims, 20 Drawing Sheets

Related U.S. Application Data

(60) Provisional application No. 62/980,091, filed on Feb. 21, 2020.

(51) Int. Cl.
*H04L 51/212* (2022.01)
*H04L 51/222* (2022.01)

(52) U.S. Cl.
CPC .......... *H04L 63/102* (2013.01); *H04L 63/105* (2013.01); *H04L 63/1433* (2013.01)

(58) Field of Classification Search
USPC ........................................................ 709/206
See application file for complete search history.

(56) References Cited

U.S. PATENT DOCUMENTS

| | | | |
|---|---|---|---|
| 7,451,487 B2 | 11/2008 | Oliver | |
| 7,610,344 B2 | 10/2009 | Mehr | |
| 7,953,814 B1 | 5/2011 | Chasin | |
| 8,566,938 B1 | 10/2013 | Prakash | |
| 8,819,819 B1 | 8/2014 | Johnston | |
| 8,935,788 B1 | 1/2015 | Diao et al. | |
| 9,009,824 B1 | 4/2015 | Chen | |
| 9,154,514 B1 | 10/2015 | Prakash | |
| 9,213,827 B2 | 12/2015 | Li | |
| 9,245,115 B1 | 1/2016 | Jakobsson | |
| 9,264,418 B1 | 2/2016 | Crosley | |
| 9,348,981 B1* | 5/2016 | Hearn | G06F 21/31 |
| 9,473,437 B1 | 10/2016 | Jakobsson | |
| 9,516,053 B1 | 12/2016 | Muddu | |
| 9,537,880 B1* | 1/2017 | Jones | H04L 63/1433 |
| 9,571,512 B2 | 2/2017 | Ray | |
| 9,686,308 B1 | 6/2017 | Srivastava | |
| 9,756,007 B1 | 9/2017 | Stringhini | |
| 9,774,626 B1 | 9/2017 | Himler | |
| 9,781,152 B1* | 10/2017 | Mistratov | H04L 63/1441 |
| 9,847,973 B1 | 12/2017 | Jakobsson et al. | |
| 9,961,096 B1 | 5/2018 | Pierce | |
| 9,967,268 B1 | 5/2018 | Hewitt | |
| 10,015,182 B1 | 7/2018 | Shintre | |
| 10,104,029 B1 | 10/2018 | Chambers | |
| 10,129,194 B1 | 11/2018 | Jakobsson | |
| 10,129,288 B1 | 11/2018 | Xie | |
| 10,243,989 B1 | 3/2019 | Ding | |
| 10,250,624 B2 | 4/2019 | Mixer | |
| 10,277,628 B1 | 4/2019 | Jakobsson | |
| 10,362,057 B1 | 7/2019 | Wu | |
| 10,397,272 B1 | 8/2019 | Bruss | |
| 10,419,468 B2 | 9/2019 | Glatfelter | |
| 10,601,865 B1 | 3/2020 | Mesdaq | |
| 10,616,272 B2 | 4/2020 | Chambers | |
| 10,673,880 B1 | 6/2020 | Pratt | |
| 10,721,195 B2 | 7/2020 | Jakobsson | |
| 10,911,489 B1* | 2/2021 | Chechik | H04L 63/1425 |
| 11,019,076 B1 | 5/2021 | Jakobsson | |
| 11,032,312 B2* | 6/2021 | Jeyakumar | G06F 16/353 |
| 11,050,793 B2* | 6/2021 | Jeyakumar | G06N 20/00 |
| 11,063,897 B2 | 7/2021 | Kessler | |
| 11,153,351 B2 | 10/2021 | Kalinin | |
| 2002/0002520 A1 | 1/2002 | Gatto | |
| 2005/0187934 A1 | 8/2005 | Motsinger | |
| 2006/0253581 A1 | 11/2006 | Dixon | |
| 2007/0074169 A1 | 3/2007 | Chess et al. | |
| 2007/0276851 A1 | 11/2007 | Friedlander | |
| 2008/0086532 A1 | 4/2008 | Cunningham | |
| 2008/0114684 A1 | 5/2008 | Foster | |
| 2009/0037350 A1 | 2/2009 | Rudat | |
| 2009/0132490 A1 | 5/2009 | Okraglik | |
| 2010/0318614 A1 | 12/2010 | Sager | |
| 2011/0173142 A1 | 7/2011 | Dasgupta | |
| 2012/0028606 A1* | 2/2012 | Bobotek | H04L 51/28 455/411 |
| 2012/0110672 A1 | 5/2012 | Judge | |
| 2012/0278887 A1 | 11/2012 | Vitaldevara et al. | |
| 2012/0290712 A1 | 11/2012 | Walter et al. | |
| 2012/0297484 A1* | 11/2012 | Srivastava | G06F 21/552 726/23 |
| 2013/0041955 A1 | 2/2013 | Chasin | |
| 2014/0013441 A1 | 1/2014 | Hencke | |
| 2014/0032589 A1 | 1/2014 | Styler | |
| 2014/0380478 A1 | 12/2014 | Canning et al. | |
| 2015/0026027 A1* | 1/2015 | Priess | G06Q 20/4016 705/35 |
| 2015/0128274 A1 | 5/2015 | Giokas | |
| 2015/0143456 A1 | 5/2015 | Raleigh | |
| 2015/0161609 A1 | 6/2015 | Christner | |
| 2015/0228004 A1 | 8/2015 | Bednarek | |
| 2015/0234831 A1 | 8/2015 | Prasanna Kumar | |
| 2015/0237068 A1 | 8/2015 | Sandke | |
| 2015/0295942 A1 | 10/2015 | Tao | |
| 2015/0339477 A1* | 11/2015 | Abrams | G06F 21/554 726/23 |
| 2016/0014151 A1 | 1/2016 | Prakash | |
| 2016/0036829 A1 | 2/2016 | Sadeh-Koniecpol | |
| 2016/0057167 A1 | 2/2016 | Bach | |
| 2016/0156654 A1 | 6/2016 | Chasin | |
| 2016/0227367 A1 | 8/2016 | Alsehly | |
| 2016/0253598 A1 | 9/2016 | Yamada et al. | |
| 2016/0262128 A1 | 9/2016 | Hailpern | |
| 2016/0321243 A1 | 11/2016 | Walia | |
| 2016/0328526 A1 | 11/2016 | Park | |
| 2016/0344770 A1 | 11/2016 | Verma | |
| 2017/0041296 A1 | 2/2017 | Ford | |
| 2017/0048273 A1 | 2/2017 | Bach | |
| 2017/0098219 A1 | 4/2017 | Peram et al. | |
| 2017/0111506 A1 | 4/2017 | Strong | |
| 2017/0186112 A1 | 6/2017 | Polapala | |
| 2017/0214701 A1 | 7/2017 | Hasan | |
| 2017/0223046 A1 | 8/2017 | Singh | |
| 2017/0230323 A1 | 8/2017 | Jakobsson | |
| 2017/0230403 A1 | 8/2017 | Kennedy | |
| 2017/0237776 A1 | 8/2017 | Higbee | |
| 2017/0251006 A1 | 8/2017 | Larosa | |
| 2017/0289191 A1 | 10/2017 | Thioux | |
| 2017/0346853 A1 | 11/2017 | Wyatt | |
| 2018/0027006 A1 | 1/2018 | Zimmermann | |
| 2018/0084003 A1 | 3/2018 | Uriel | |
| 2018/0084013 A1 | 3/2018 | Dalton | |
| 2018/0091453 A1 | 3/2018 | Jakobsson | |
| 2018/0091476 A1 | 3/2018 | Jakobsson | |
| 2018/0196942 A1 | 7/2018 | Kashyap | |
| 2018/0219888 A1 | 8/2018 | Apostolopoulos | |
| 2018/0227324 A1 | 8/2018 | Chambers | |
| 2018/0295146 A1* | 10/2018 | Kovega | H04L 63/1425 |
| 2018/0324297 A1 | 11/2018 | Kent | |
| 2019/0014143 A1 | 1/2019 | Syme | |
| 2019/0026461 A1 | 1/2019 | Cidon | |
| 2019/0028509 A1 | 1/2019 | Cidon | |
| 2019/0052655 A1 | 2/2019 | Benishti | |
| 2019/0065748 A1 | 2/2019 | Foster | |
| 2019/0068616 A1 | 2/2019 | Woods | |
| 2019/0089711 A1 | 3/2019 | Faulkner | |
| 2019/0104154 A1 | 4/2019 | Kumar | |
| 2019/0109863 A1 | 4/2019 | Traore | |
| 2019/0141183 A1 | 5/2019 | Chandrasekaran | |
| 2019/0166161 A1 | 5/2019 | Anand | |
| 2019/0166162 A1 | 5/2019 | Anand | |
| 2019/0199745 A1 | 6/2019 | Jakobsson | |
| 2019/0205511 A1* | 7/2019 | Zhan | G06F 21/316 |
| 2019/0222606 A1 | 7/2019 | Schweighauser et al. | |

(56) References Cited

U.S. PATENT DOCUMENTS

| | | |
|---|---|---|
| 2019/0238571 A1 | 8/2019 | Adir |
| 2019/0311121 A1 | 10/2019 | Martin |
| 2019/0319905 A1 | 10/2019 | Baggett |
| 2019/0384911 A1 | 12/2019 | Caspi |
| 2020/0007502 A1* | 1/2020 | Everton ............... H04L 51/063 |
| 2020/0021609 A1 | 1/2020 | Kuppanna |
| 2020/0044851 A1 | 2/2020 | Everson |
| 2020/0053111 A1* | 2/2020 | Jakobsson ............... H04L 51/12 |
| 2020/0076825 A1 | 3/2020 | Vallur |
| 2020/0125725 A1* | 4/2020 | Petersen ............. G06F 21/6245 |
| 2020/0162483 A1 | 5/2020 | Farhady |
| 2020/0204572 A1 | 6/2020 | Jeyakumar |
| 2020/0287936 A1* | 9/2020 | Nguyen ............. H04L 63/1483 |
| 2020/0344251 A1 | 10/2020 | Jeyakumar |
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396258 A1 | 12/2020 | Jeyakumar |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1* | 6/2021 | Dunn .................... G06F 21/554 |
| 2021/0240836 A1 | 8/2021 | Hazony |
| 2021/0272066 A1 | 9/2021 | Bratman |
| 2021/0288990 A1* | 9/2021 | Kao ...................... H04L 67/125 |
| 2021/0295179 A1 | 9/2021 | Eyal Altman |
| 2021/0297444 A1* | 9/2021 | Jeyakumar ............ G06F 16/353 |
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |
| 2021/0374680 A1 | 12/2021 | Bratman |
| 2022/0021700 A1 | 1/2022 | Devlin |

OTHER PUBLICATIONS

International Search Report and Written Opinion dated Apr. 24, 2020 of PCT/US2019/067279 (14 pages).

Mahjajan, Sonal, et al., "Finding HTML Presentation Failures Using Image Comparison Techniques", ASE' 14, pp. 91-98 (Year: 2014).

Mont, Marco Casassa, "Towards accountable management of identity and privacy: Sticky policies and enforceable tracing services", 14th International Workshop on Database and Expert Systems Applications, 2003 Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

300
AI-Driven Actions
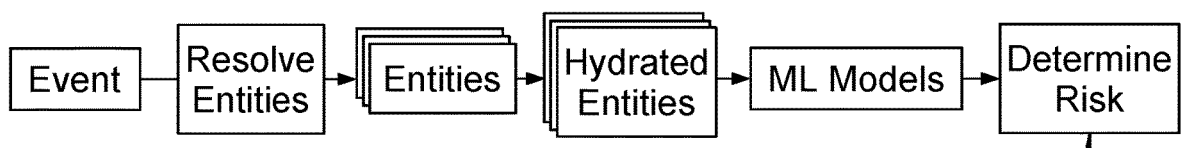
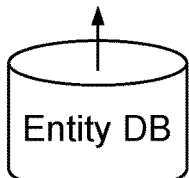
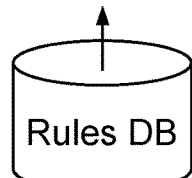
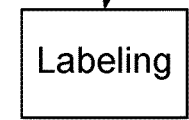
Human-Driven Actions
FIGURE 3

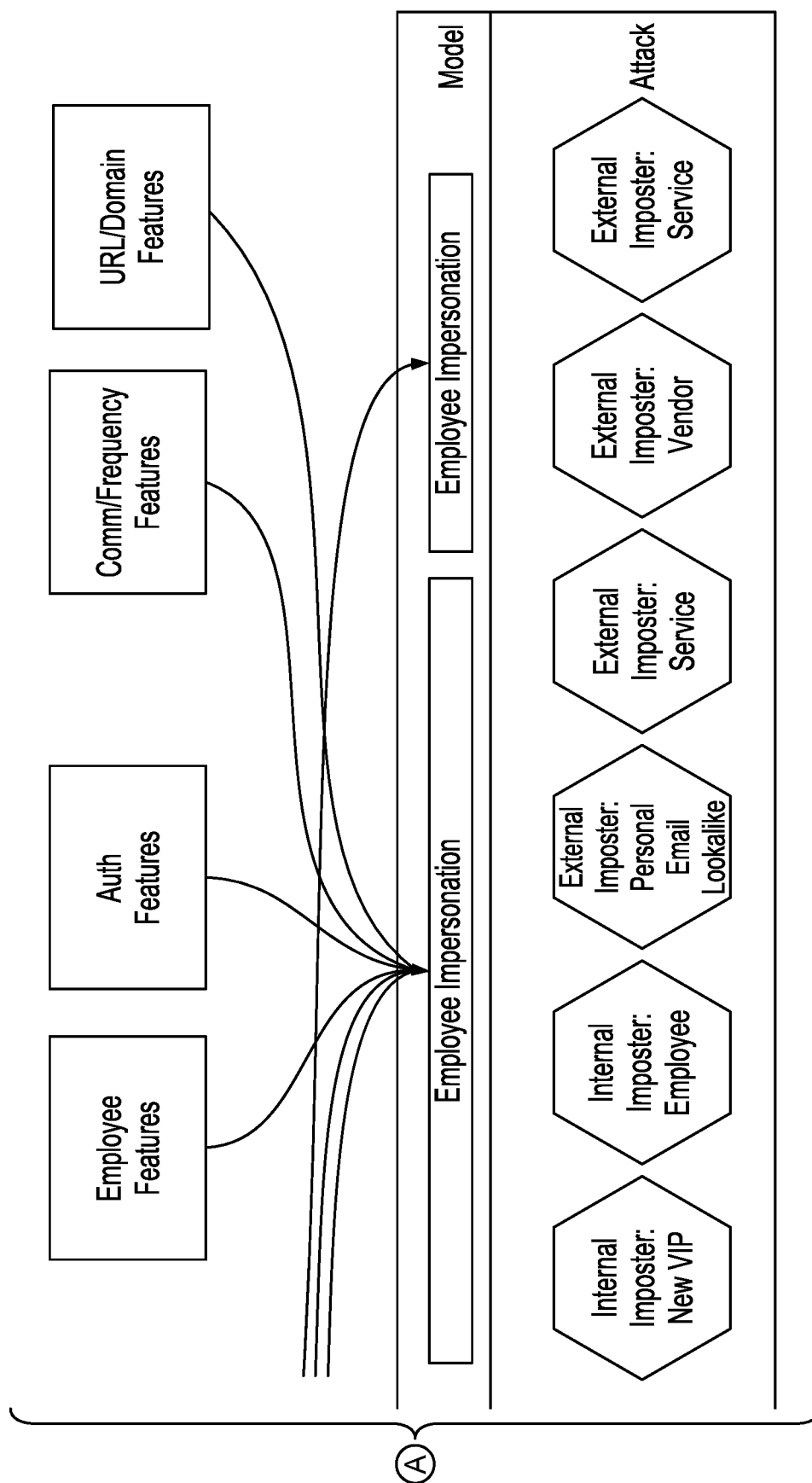
FIGURE 6, CONT.

| Interaction | Compromise Likelihood | Show Enterprise? | Enterprise-Facing Explanation | Expected Enterprise Response |
|---|---|---|---|---|
| Employee sends internal phishing email | 100% | Yes | Compromise with internal attack in progress | Reset passwords; communicate internally |
| Employee has sign-in event from malicious IP/browser | 95% | Yes | Compromise with suspicious login | Reset passwords; communicate internally |
| Employee has suspicious mail filter | 80% | Yes | Compromise with suspicious mail filter | Reset passwords; communicate internally |
| Employee has digital activity in high-risk country | 80% | Yes | Compromise with suspicious event/login | |
| Employee has digital activity in new country w/ new device | 40% | Yes | Compromise with suspicious event/login | |
| Employee has unknown digital activity deemed risky | 20% | No | | |
| Employee relies to phishing email and opens link | 30% | Yes | Phishing site interaction | |
| Employee relies to phishing email | 10% | Maybe | Phishing email engagement | |
| Employee receives phishing email | 1% | Maybe | Phishing email recipient | |
| Employee infected with malware | 20% | Maybe | | |

FIGURE 10

DISCOVERING EMAIL ACCOUNT COMPROMISE THROUGH ASSESSMENTS OF DIGITAL ACTIVITIES

CROSS-REFERENCE TO RELATED APPLICATIONS

This application is a continuation-in-part of U.S. application Ser. No. 16/888,129, titled "Discovering Email Account Compromise Through Assessments of Digital Activities" and filed on May 29, 2020, which claims priority to U.S. Provisional Application No. 62/980,091, titled "Discovering Email Account Compromise Through Assessments of Digital Activities" and filed on Feb. 21, 2020, each of which is incorporated herein by reference in its entirety.

TECHNICAL FIELD

Various embodiments concern computer programs and associated computer-implemented techniques for discovering instances of email account compromise that represent threats to the security of enterprises.

BACKGROUND

Email account compromise is an exploit in which an unauthorized entity (also referred to as an "attacker") gains access to the email account of an employee of an enterprise (also referred to as a "business," "company," or "organization") and then imitates the employee. By stealing the employee's identity, the attacker can defraud the enterprise and its employees, customers, and vendors. Collectively, these individuals may be referred to as the "targets" of the attacker.

Email account compromise can take a variety of different forms. In many cases, attackers will focus their efforts on employees who have access to sensitive financial information or who are responsible for financial tasks such as paying invoices or initiating wire transfers. For example, an attacker may mimic the identity of an employee on an enterprise network (also referred to as a "business network," "company network," or "organization network") to trick a target into providing the account number of a financial account associated with the enterprise. As another example, an attacker may mimic the identity of an employee on an enterprise network to trick the target into sending money to an account associated with the attacker.

BRIEF DESCRIPTION OF THE DRAWINGS

FIG. 3 includes a high-level illustration of a process in which a threat detection platform identifies a compromise signal.

FIG. 10 provides an example matrix of the decisions that may be made by a threat detection platform as it discovers compromise signals corresponding to digital activities.

Figure 1:
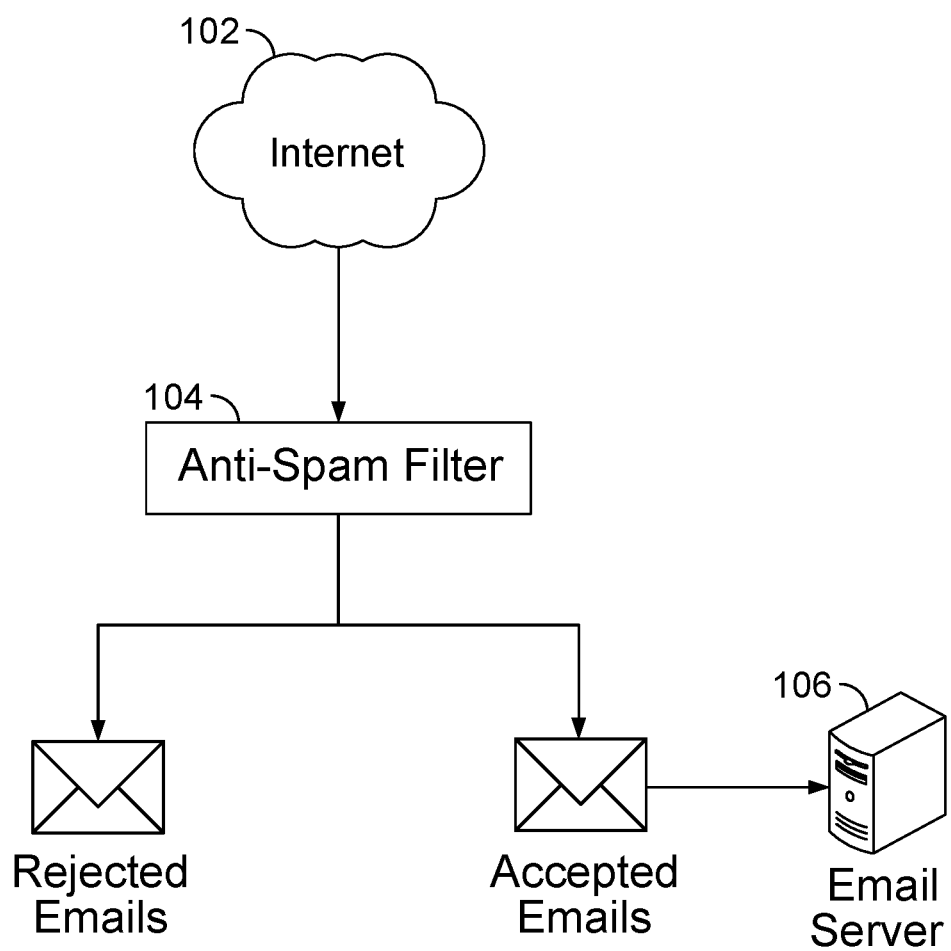
FIG. 1 illustrates how a conventional filtering service can examine incoming emails to determine which emails, if any, should be prevented from reaching their intended destination.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Email account compromise represents one type of business email compromise (BEC) scam. Traditionally, enterprises have protected themselves against BEC scams by employing various defenses, such as anti-spam filters that quarantine malicious emails, intrusion detection rules that flag emails with extensions similar to the domain of the enterprise (e.g., an authentic email whose domain is ABC-_Company.com could flag a fraudulent email whose domain is ABC-Company.com), and color coding schemes that cause internal emails to be shown in one color while external emails are shown in another color. But these approaches are largely ineffective in discovering instances of email account compromise since the attacks originate from within the enterprise. This is problematic due to the significant threat that email account compromise represents.

Introduced here, therefore, are threat detection platforms designed to discover possible instances of email account compromise in order to identify threats to an enterprise. In particular, a threat detection platform can examine the digital activities performed with the email accounts associated with employees of the enterprise to determine whether any email accounts are exhibiting abnormal behavior. Examples of digital activities include the reception of an incoming email, transmission of an outgoing email, creation of a mail filter, occurrence of a sign-in event (also referred to as a "login event"), and identification of an identity risk event (e.g., as determined by Microsoft Office® 365). Thus, the threat detection platform can monitor the digital activities performed with a given email account to determine the likelihood that the given email account has been compromised.

Generally, an email account will be identified as possibly compromised if the threat detection platform discovers that the email account either (i) performed at least one digital activity that deviated from past behavior in a meaningful way or (ii) performed at least one digital activity that increased the risk to the security of the enterprise. Examples of digital activities that increase the risk to the security of the enterprise include the transmission of a fraudulent invoice via internal email and the transmission of a phishing attack via internal email. The term "internal email" refers to emails sent within an enterprise (e.g., from an email account associated with one employee to an email account associated with another employee). Generally, internal emails are delivered via an enterprise mail system (also referred to as a "corporate mail system") without traversing the Internet. The term "external email," meanwhile, may refer to emails that are received from, or transmitted to, addresses external to the enterprise. While embodiments may be discussed in the context of determining whether email accounts associated with employees of an enterprise are compromised, those skilled in the art will recognize that the features are similarly applicable to other individuals. For example, the threat detection platform could be deployed to examine email transmitted and/or received by a personal email account created through Gmail, Yahoo! Mail, iCloud Mail, etc.

As further discussed below, the threat detection platform may build a separate model for each email account associated with an enterprise that is representative of the normal behavior of the corresponding employee. The threat detection platform can compare the digital activities performed with each email account to the corresponding model to see whether any deviations exist. Deviations may be indicative of potential compromise since it means that the behavior of the email account has changed. By establishing what constitutes normal behavior on a per-employee basis, the threat detection platform can more readily discover and then address instances of email account compromise before the enterprise is harmed.

Moreover, the threat detection platform may leverage machine learning, heuristics, rules, and/or human-in-the-loop feedback to improve its ability to discover instances of email account compromise. For example, the threat detection platform may employ a series of rules that separately examine attributes of emails generated by an email account, such as the geographical origin, sender identity, sender email address, recipient identity, recipient email address, subject, body content, presence or content of attachments, etc. Based on these attributes, the series of rules may indicate whether the email account should be examined further due to suspected compromise.

If the threat detection platform determines that an email account may be compromised, the threat detection platform may automatically determine which remediation actions, if any, are appropriate. The remediation actions may depend on the confidence level of the threat detection platform in its determination, the types of digital activities that prompted suspicion, or the threat posed by the compromise. For example, if the threat detection platform determines there is a low likelihood that the email account has been compromised, then the threat detection platform may simply identify the email account as needing further monitoring. However, if the threat detection platform determines there is a high likelihood that the email account has been compromised, then the threat detection platform may restrict access to an enterprise network or prevent further digital activities from being performed. For instance, the threat detection platform could temporarily divert emails generated by the email account into a quarantine inbox until further analysis can occur. Alternatively, the threat detection platform may terminate all active sessions of the email account and prompt the true owner to reset her password. As further discussed below, the likelihood that the email account has been compromised may be determined based on the volume, nature, or type of digital activities performed with the email account under examination.

Perpetrators of email account compromise may employ several different approaches. These approaches include:
Reimbursement schemes in which the attacker requests funds for payment;
Fraud schemes in which the attacker poses as, for example, an executive to request sensitive information or funds; and
Theft schemes in which sensitive information, such as financial information or personal information, is exfiltrated (e.g., by downloading such information from an enterprise network, or by requesting such information from employees in the finance department or human resources department).

While embodiments may be described in the context of a certain approach, those skilled in the art will recognize that the features described herein may be employed to inhibit the impact of email account compromise as a whole. Moreover, embodiments may be described in the context of a certain type of digital activity (e.g., the transmission of an outgoing email) for the purpose of illustration. However, those skilled in the art will recognize that the features described herein are equally applicable to other types of digital activities.

The technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program an electronic device to perform a process for obtaining data related to the digital activities of an email account, examining the data to identify a series of events representative of potential threats to the security of an enterprise, producing a score for each event that corresponds to deviation from past digital activities of the email account, and then determining, based on the scored events, a likelihood that the email account is compromised.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, firmware components, and/or hardware components. Modules are typically functional components that generate data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Conventional Filtering Services

Basic filtering services are offered by most email platforms. FIG. 1 illustrates how a conventional filtering service can examine incoming emails to determine which emails, if any, should be prevented from reaching their intended destination. In some instances an enterprise applies an anti-spam filter 104 to incoming emails received via the Internet, while in other instances another entity, such as an email service, applies the anti-spam filter 104 to the incoming emails on behalf of the enterprise. As noted above, the term "external emails" may be used to refer to emails received via the Internet 102, while the term "internal emails" may be used to refer to emails that are sent within the enterprise. An example of an internal email is an intra-enterprise email (e.g., an email from one employee to another employee) that is delivered directly to the mailbox of the recipient rather than routed through the mail exchanger (MX) record, external gateways, etc.

Generally, the anti-spam filter 104 is designed to quarantine malicious emails using blacklists of senders, sender email addresses, and Uniform Resource Locators (URLs) that have been detected in past unsolicited emails and/or policy frameworks defined by the enterprise. The term "anti-spam filter," as used herein, can refer to any legacy email security mechanism capable of filtering incoming emails, including secure email gateways (SEGs) (also referred to as "gateways"). For example, the enterprise (or the email service) may maintain a list of sender email addresses from which malicious email has been received in the past. As another example, an enterprise may decide to implement a policy that prohibits employees from receiving emails originating from a given domain. Malicious emails that are caught by the anti-spam filter 104 can be quarantined so as to remain hidden from the intended recipients, while non-malicious emails may be stored on an email server 106 for subsequent access by the intended recipients. Email servers (also referred to as "mail servers") facilitate the delivery of emails from senders to recipients. Normally, an email will be transferred amongst a series of email servers as it travels toward its intended destination. This series of email servers allows emails to be sent between dissimilar address domains.

Email servers can be broken down into two main categories: outgoing mail servers and incoming mail servers. Outgoing mail servers may be referred to as Simple Mail Transfer Protocol (SMTP) servers. Incoming mail servers will generally be either Post Office Protocol Version 3 (POP3) servers or Internet Message Access Protocol (IMAP) servers. POP3 servers are known for storing transmitted/received messages on local hard drives, while IMAP servers are known for storing copies of messages on servers (though most POP3 servers can store messages on servers too). Thus, the location of emails received by an enterprise may depend on the type of incoming mail server used by the enterprise.

Because of the manner in which anti-spam filters are deployed, however, these filters will not quarantine email messages generated by a compromised email account. Instead, these harmful email messages will simply reach their intended destination since the attacks originate from within the enterprise. In short, anti-spam filters are designed to prevent incoming emails deemed to be malicious from reaching their intended destination. Anti-spam filters simply are not designed to detect internal emails (as well as outgoing external emails) that are generated by a compromised email account. Accordingly, a new approach is needed in order to discover instances of email account compromise in near real time before significant damage is done.

Overview of Threat Detection Platforms

Figure 2:
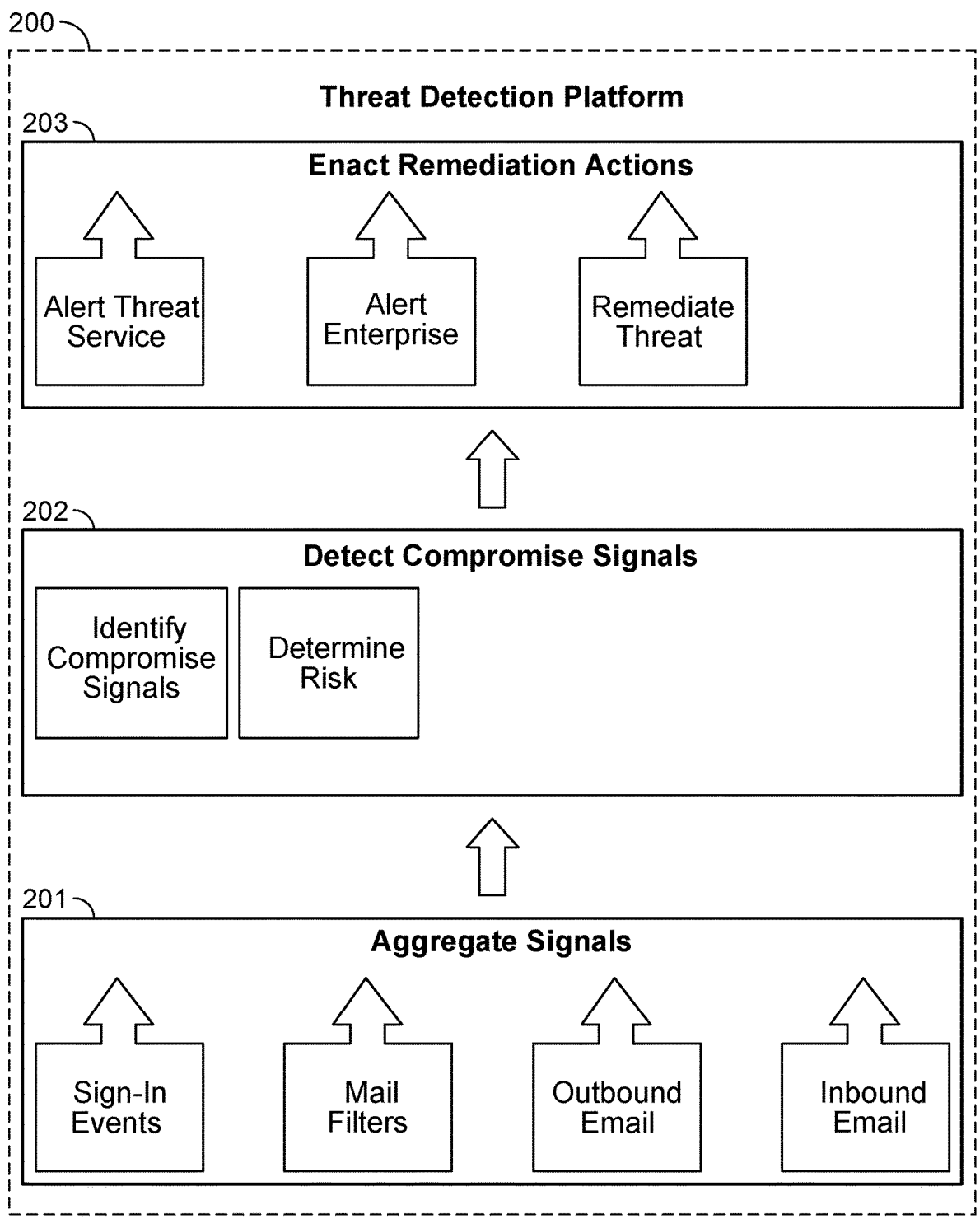
FIG. 2 illustrates how a threat detection platform may employ a multi-tiered approach to aggregate information (also referred to as "signals") related to the employees of an enterprise, examine the signals to discover compromise signals that may be indicative of email account compromise, and then enact remediation actions to address the threat to an enterprise.

FIG. 2 illustrates how a threat detection platform 200 may employ a multi-tiered approach to aggregate information (also referred to as "signals") related to the employees of an enterprise (step 201), examine the signals to discover compromise signals that may be indicative of email account compromise (step 202), and then enact remediation actions (step 203) to address the threat to an enterprise.

Unlike conventional filtering services, the threat detection platform 200 can be completely integrated within the enterprise environment. For example, the threat detection platform may receive input indicative of an approval by an individual (e.g., an administrator associated with the enterprise) to access data related to the digital activities performed with email accounts associated with employees of the enterprise. The data may include, for example, information on emails (e.g., incoming emails and outgoing emails), mail filters, mail groups, sign-in events, identity risk events, active directory, accessed documents, etc. The approval may be given through an interface generated by the threat detection platform 200. For example, the individual may access an interface generated by the threat detection platform 200 and then approve access to the data as part of a registration process.

Then, the threat detection platform 200 can establish a connection with one or more storage mediums that include the data via corresponding application programming interfaces (APIs). For example, the threat detection platform 200 may establish, via an API, a connection with a computer server managed by the enterprise or some other entity on behalf of the enterprise. The threat detection platform 200 can download the data from the storage medium(s) in a programming environment managed by the threat detection platform 200. For instance, the threat detection platform 200 may obtain information regarding the outgoing emails, incoming emails, mail filters, and sign-in events associated with each email account managed by the enterprise. As further discussed below, the threat detection platform 200 may process the information in order to define a series of digital activities performed with each email account over time. The information that defines each digital activity may be referred to as a "signal."

Accordingly, the threat detection platform 200 may be designed to obtain and/or monitor data in at least one datastore via an API, aggregate the data in these datastores, and then canonicalize the data into a single event stream in order to perform behavioral analysis (e.g., by detecting behavioral deviations). Such an approach ensures that the data in these various datastores can be holistically monitored to gain a better understanding of behavioral patterns on a per account, per-employee, or per-enterprise basis. Since the data can be accessed via APIs, direct integration (e.g., into the computing environment of an enterprise) normally is not necessary.

In some embodiments, the threat detection platform 200 is programmed to build a separate machine learning (ML) model for each employee based on the retrospective information regarding the digital activities performed with the corresponding email account in order to better identify instances of email account compromise in near real time. For example, the threat detection platform 200 may ingest digital activities performed with an email account over the last six months, and then the threat detection platform may build an ML model that understands how the email account normally accesses the enterprise network, communicates internally (e.g., via internal email with other employees), or communicates externally (e.g., via external email with vendors). The ML model may help identify when the behavior of the email account has changed.

Such an approach allows the threat detection platform 200 to employ an effective ML model nearly immediately upon receiving approval from the enterprise to deploy it. Unlike conventional security products that only have access moving forward in time (i.e., after receiving the approval), the threat detection platform 200 may employ a backward-looking approach to develop ML models that are effective upon deployment. Such an approach also enables the threat detection platform to go through a repository of past digital activities to identify whether any email accounts should presently be suspected of compromise.

The aforementioned API-based approach provides a consistent way of looking at information related to the digital activities performed with email accounts belonging to employees of an enterprise. Because the threat detection platform 200 can directly access the emails (e.g., external emails and internal emails) transmitted and received by these email accounts, the threat detection platform 200 can examine the internal emails that are invisible to standard integration solutions. For example, a SEG integration that occurs through the mail exchanger (MX) record will only be able to see external emails arriving from, or destined for, external sources. The only way to make internal email visible to the SEG integration would be to externally reroute the email through the gateway.

The threat detection platform 200 may design/train the ML models to discover possible instances of email account compromise by examining the aggregated signals. As shown in FIG. 2, the threat detection platform 200 can parse the aggregated signals to identify compromise signals that indicate an email account may be compromised, and then the threat detection platform can determine the risk to the enterprise based on the compromise signals. FIG. 3 includes a high-level illustration of a process 300 in which a threat detection platform identifies a compromise signal. Initially, the threat detection platform will determine a digital activity (also referred to as a "risk event" or "event") has been performed. As discussed above, the threat detection platform may be programmatically integrated with storage medium(s) to obtain information regarding the digital activity. For example, the threat detection platform may be programmatically integrated with an email service employed by an enterprise so that all external emails and/or internal emails are routed through the threat detection platform for examination.

Then, the threat detection platform may perform an entity resolution procedure in order to identify the entities involved in the digital activity. Generally, the entity resolution procedure is a multi-step process. First, the threat detection platform will acquire information regarding the digital activity. For example, if the digital activity is the transmission of an email, the threat detection platform may examine the email to identify the recipient identity, recipient email address, subject, body content, etc. Moreover, the threat detection platform may be able to determine whether the email includes any links or attachments. Second, the threat detection platform will resolve entities involved in the digital activity by examining the acquired information. Some information may correspond directly to an entity. For example, the identity of the recipient may be established based on the recipient email address. Other information may correspond indirectly to an entity. For example, the identity of the recipient could be established by applying a natural language processing (NLP) algorithm and/or a computer vision (CV) algorithm to the body of the email. Further information regarding entity resolution can be found in Patent Cooperation Treaty (PCT) Application No. PCT/US2019/67279, titled "Threat Detection Platforms for Detecting, Characterizing, and Remediating Email-Based Threats in Real Time," which is incorporated by reference herein in its entirety.

In some embodiments, the threat detection platform augments the acquired information with human-curated content.

For example, information regarding the entities may be extracted from human-curated datasets of known vendors, domains, URLs, etc. These human-curated datasets may be used to augment the information gleaned from the enterprise's own data. Additionally or alternatively, humans may be responsible for labeling entities in some situations. For example, a human may be responsible for labeling the URLs of links found in emails.

The threat detection platform can examine the entities to determine whether any digital activities should be characterized as compromise signals (also referred to as "indicators of compromise"). The term "compromise signal," as used herein, may refer to information related to a digital activity that indicates the corresponding email account may be compromised. One example of a compromise signal is a URL for a phishing page discovered in the body of an email. Another example of a compromise signal is a recipient email address that has not been contacted in the past.

If the threat detection platform discovers a compromise signal related to the digital activity, the threat detection platform can determine what remediation actions, if any, are appropriate as shown in FIG. 2. For example, the threat detection platform may notify a threat service (also referred to as a "security service") that the email account may be compromised. As another example the threat detection platform may notify the enterprise that the email account may be compromised. For instance, the notification may be delivered to an individual in the information technology (IT) department of the enterprise. Additionally or alternatively, the threat detection platform may automatically perform remediation actions based on the confidence level of the threat detection platform in its determination, the types of digital activities that prompted suspicion, or the threat posed by the compromise.

Figure 4:
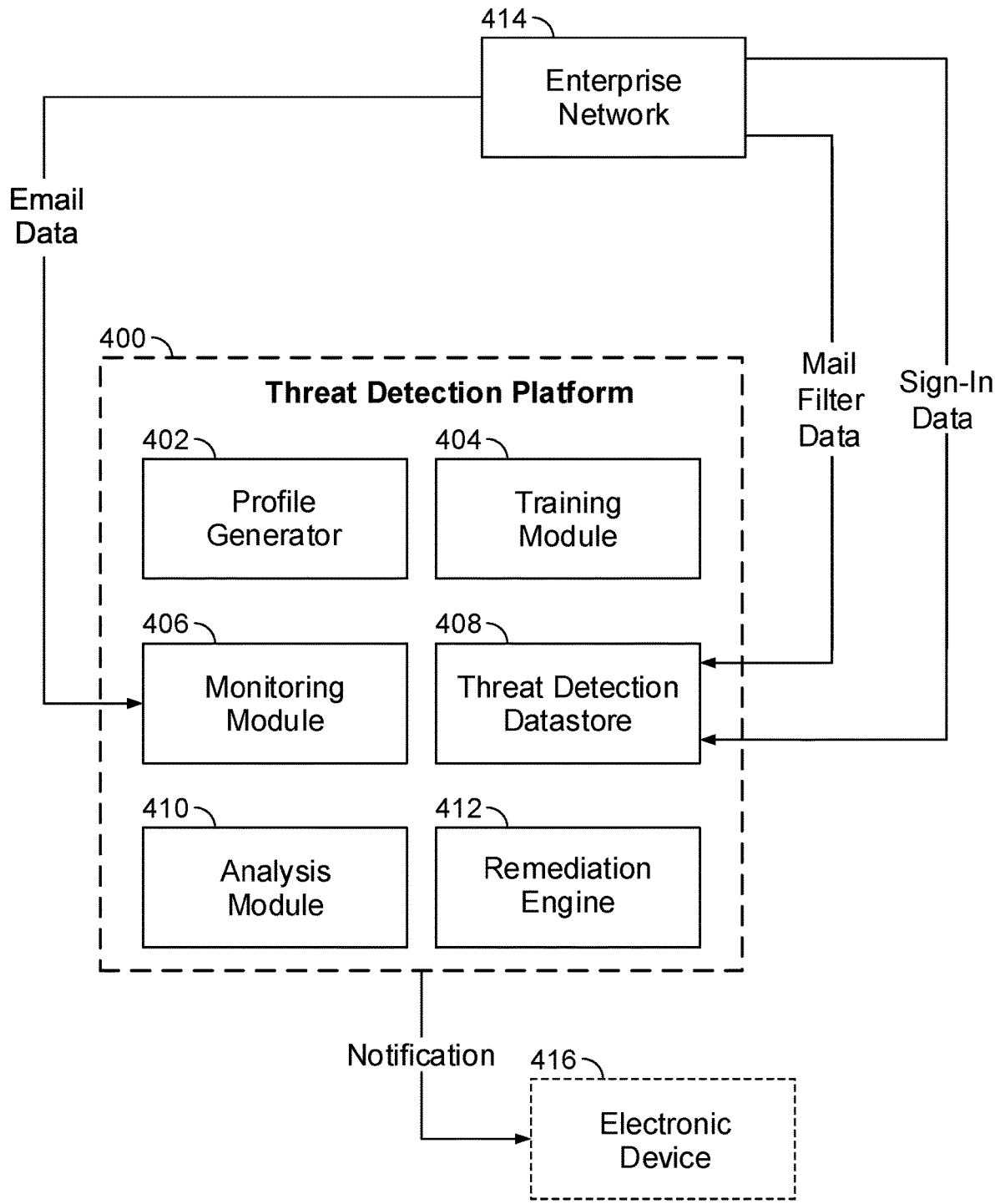
FIG. 4 depicts an example of a platform able to detect threats to an enterprise network posed by compromised email accounts belonging to employees.

FIG. 4 depicts an example of a platform 400 able to detect threats to an enterprise network 414 (also referred to as a "customer network" or "corporate network") posed by compromised email accounts belonging to employees. As shown in FIG. 4, the threat detection platform 400 may include a profile generator 402, a training module 404, a monitoring module 406, a threat detection datastore 408, an analysis module 410, and a remediation engine 412. Some embodiments of the threat detection platform 400 include a subset of these components, while other embodiments of the threat detection platform 400 include additional components that are not shown in FIG. 4.

At a high level, the threat detection platform 400 can acquire data related to digital activities involving the email accounts and then determine, based on an analysis of the data, whether any of these email accounts have been compromised. As shown in FIG. 4, the data may include information related to emails, mail filters, and sign-in events. Thus, the threat detection platform 400 can detect possible instances of email account compromise based on emails (e.g., the content of the body or attachments), email metadata (e.g., information regarding the sender, recipient, origin, time of transmission, etc.), sign-in metadata (e.g., information regarding the time and location of each sign-in event), and other suitable data.

The threat detection platform 400 can be implemented, partially or entirely, within the enterprise network 414, a remote computing environment (e.g., through which emails, or information related to those emails, can be routed for analysis), a gateway, or another suitable location. The remote computing environment can belong to, or be managed by, the enterprise or another entity. The threat detection platform 400 may be integrated into the enterprise's email system inline (e.g., at the SEG), via an API (e.g., where the platform receives email data via an API such as the Microsoft Outlook® API), or another suitable manner. Thus, the threat detection platform 400 can supplement and/or supplant other security products employed by the enterprise.

In a first variation, the threat detection platform 400 is maintained by a threat service (also referred to as a "security service") that has access to multiple enterprises' data. In this variation, the threat detection platform 400 can route data related to digital activities to a computing environment managed by the security service. The computing environment may be, for example, an instance on Amazon Web Services (AWS). The threat detection platform 400 may maintain one or more databases for each enterprise that includes, for example, organization charts, attribute baselines, communication patterns, etc. Additionally or alternatively, the threat detection platform 400 may maintain federated database(s) shared amongst multiple entities such as detector databases, vendor databases, etc. The security service may maintain different instances of the threat detection platform 400 for different enterprises, or the security service may maintain a single instance of the threat detection platform 400 for multiple enterprises. The data hosted in these instances can be obfuscated, encrypted, hashed, depersonalized (e.g., by removing personal identifying information), or otherwise secured or secreted. Accordingly, each instance may only be able to access/process data related to the digital activities performed with the email accounts associated with the corresponding enterprise(s).

In a second variation, the threat detection platform 400 is maintained by the enterprise whose emails are being monitored (e.g., either remotely or on premises). In this variation, all relevant data related to digital activities can be hosted by the enterprise itself, and any information to be shared across multiple enterprises can be shared with a computing system maintained by the security service or a third party.

As shown in FIG. 4, the profile generator 402, training module 404, monitoring module 406, threat detection datastore 408, analysis module 410, and remediation engine 412 can be part of the threat detection platform 400. Alternatively, these components could be implemented individually. For example, the remediation engine 412 may be implemented in a remote computing environment to which the threat detection platform 400 is communicatively connected across a network. The threat detection platform 400 may be implemented by the security service, an enterprise, an individual associated with the enterprise, a trusted third party, or another service, entity, or individual. In some embodiments, aspects of the threat detection platform 400 are enabled by a web-accessible computer program operating on a computer server or a distributed computing system. For example, an individual may be able to interface with the threat detection platform 400 through a web browser executing on an electronic device.

The enterprise network 414 can be a mobile network, wired network, wireless network, wireless spectrum network, or another communication network maintained by the enterprise or an operator on behalf of the enterprise. As noted above, the enterprise may utilize a security service to examine emails (among other things) to discover possible instances of email account compromise. The enterprise may grant permission to the security service to monitor the enterprise network 414 by examining emails (e.g., incoming emails and outgoing emails), analyzing those emails to discover possible instances of email account compromise, and then performing some remediation action if a threat is discovered. In some embodiments, the enterprise further grants permission to the security service to obtain data about other digital activities involving the enterprise (and, more specifically, employees of the enterprise) in order to build a profile that specifies communication patterns, behavioral traits, normal content, etc.

The threat detection platform 400 may include one or more databases in which enterprise data, threat analysis data, remediation policies, communication patterns, behavioral traits, and other data can be stored. Here, for example, the threat detection platform 400 includes a threat detection datastore 408 that includes email data, mail filter data, and sign-in data associated with the email accounts belonging to employees of an enterprise. Other types of data, such as data related to identity risk events, could also be stored in the threat detection datastore 408. This data may be determined by the threat detection platform 400 (e.g., learned from data available on the enterprise network 414), provided by the enterprise, or retrieved from an external database (e.g., associated with LinkedIn® or Microsoft Office 365®). In some embodiments, the threat detection datastore 408 also stores outputs produced by the threat detection platform 400, including machine- and human-readable information on discovered instances of email account compromise and any remediation actions that were taken.

By examining the email data, mail filter data, and sign-in data, the threat detection platform 400 can discover organizational information (e.g., the employees, titles, and hierarchy), employee behavioral traits (e.g., based on historical emails and historical sign-in events), normal email content, normal email addresses, communication patterns (e.g., who each employee communicates with internally and externally, when each employee typically communicates), etc.

In some embodiments, the threat detection platform 400 includes a profile generator 402 that generates one or more profiles for the enterprise. For example, the profile generator 402 may generate a separate profile for each email account associated with an employee of the enterprise based on the email data, mail filter data, or sign-in data. Additionally or alternatively, profiles may be generated for business groups, organizational groups, or the enterprise as a whole. These profiles are preferably used as the baseline for what constitutes normal activity by each email account (or group of email accounts) but could be used in other manners.

A profile may include primary attributes, secondary attributes, or other suitable features. These attributes may be represented as median values, mean values, standard deviations, ranges, or thresholds. Moreover, the profile may include a series of values in a temporal order so that deviations (e.g., in the time of sign-in events, or in the other employees to which outgoing emails are addressed) can be more easily detected.

Primary attributes are preferably features extracted directly from a communication or an event by an extraction module (also referred to as an "extractor"). The term "extractor," as used herein, may be used to refer to a piece of software programmed to extract a given type of information from underlying data. Generally, each primary attribute is extracted by a separate primary extractor. Primary extractors can be global (e.g., shared across multiple enterprises) or specific to an enterprise. Examples of primary attributes include the sender display name, sender username, recipient display name, recipient username, Sender Policy Framework (SPF) status, DomainKeys Identified Mail (DKIM) status, number of attachments, number of links in the body, spam/phishing metrics (e.g., continent or country of origin), whether data between two fields that should match are mismatched, and header information. Primary attributes could also be derived from metadata associated with a communication. Examples of such primary attributes include an enterprise identifier, message identifier, conversation identifier, sender identifier, time of transmission/receipt, etc.

Secondary attributes are generally attributes that are determined from the primary attributes and/or other data (e.g., as determined from the threat detection datastore 408). For example, the secondary attributes may be extracted, inferred, or calculated from the primary attributes. The secondary attributes may be determined by one or more secondary extractors. Secondary extractors can be global (e.g., shared across multiple enterprises) or specific to an enterprise. The secondary attributes can be determined from a temporal series of primary attribute values (e.g., where each primary attribute value is associated with a timestamp, such as the sent timestamp or receipt timestamp), from a single primary attribute value, or from the values of multiple primary attributes. Examples of secondary attributes include frequencies, such as sender frequencies (e.g., sender fully qualified domain name (FQDN) frequencies, sender email frequencies, etc.), recipient frequencies (e.g., recipient FQDN frequencies, recipient email frequencies, etc.), and domain frequencies (e.g., SPF status frequencies for a given domain, DKIM status frequencies for a given domain, the frequency with which the enterprise receives comparable emails from a given domain, the number/frequency of emails received from a given domain, the number/frequency of emails transmitted to a given domain, etc.); mismatches between primary attributes that should match; employee attributes (e.g., name, title, employment status, attack history, etc.); whether the body of an outgoing/incoming email includes high-risk words, phrases, or sentiments (e.g., whether the body includes financial vocabulary, credential theft vocabulary, engagement vocabulary, non-ASCII content, attachments, links, etc.); domain information (e.g., domain age, whether the domain is blacklisted or whitelisted, whether the domain is internal or external, etc.); heuristics (e.g., whether an attachment or link has been seen before in communications from a given email account, whether a given email account has previously communicated during a given timeframe, from a given location, etc.); and notable deviations (e.g., in the frequency, content, or location of activities performed with a given email account). As noted above, the secondary attributes may be determined as a function of the primary attributes. An example of a primary attribute is an email address associated with an email account belonging to an employee of an enterprise, while an example of a secondary attribute is statistics regarding the pattern of digital activities (e.g., sign-in events) performed with the email account.

A profile could include a number of behavioral traits associated with the corresponding email account. For example, the profile generator 402 may determine the behavioral traits based on the email data, mail filter data, and sign-in data obtained from the enterprise network 414. The email data may include information on the recipients of past emails sent by a given email account, content of the past emails, frequency of the past emails, temporal patterns of the past emails, formatting characteristics (e.g., usage of HTML, fonts, styles, etc.), sensitive topics on which the corresponding employee is explicitly or implicitly authorized to communicate, geographical location from which the past emails originated, and more. Thus, the profile generator 402 may attempt to build a profile for each email account that represents a model of normal behavior of the corresponding employee (and, by extension, what abnormal behavior may constitute for purposes of identifying possible instances of email account compromise).

Examples of questions that the profile may attempt to address for a given email account include: What email addresses does the given email account communicate with? What topics does the given email account normally discuss? What are normal login times for the given email account? What are normal email sending times for the given email account? What Internet Protocol (IP) address(es) does the given email account log in from? What geographical locations does the given email account log in from? Does the given email account have any suspicious mail filters set up (e.g., hackers of compromised email accounts may automatically delete incoming emails containing certain keywords to conceal illicit activity from the true owner)? What tone/style does the given email account use? What terms (e.g., "cheers" or "thanks") are typically used by the given email account? When the given email account sends emails with links/attachments, what are the characteristics (e.g., name, extension, type, size) of those attachments?

The monitoring module 406 operates to monitor emails handled by the enterprise network 414. These emails may include incoming emails (e.g., external emails and internal emails) received by email accounts associated with employees of the enterprise and outgoing emails (e.g., external emails and internal emails) transmitted by those email accounts. In some embodiments, the monitoring module 406 is able to monitor incoming emails and/or outgoing emails in near real time so that actions can be taken if a possible instance of email account compromise is discovered. For example, if the monitoring module 406 discovers that outgoing emails generated by an email account indicate that the email account may have been compromised, the remediation engine 412 may temporarily prevent all outgoing emails transmitted by the email account from reaching their intended destination. In some embodiments, the monitoring module 406 is able to monitor incoming emails and/or outgoing emails only upon the threat detection platform 400 being granted permission by the enterprise (and thus given access to the enterprise network 414).

The analysis module 410 operates to analyze each digital activity performed with an email account to determine the likelihood that the email account has been compromised. For example, the analysis module 410 may examine each email received and/or transmitted by the email account to determine whether those emails deviate from past email activity. In such embodiments, the analysis module 410 may determine whether a given email deviates from the past email activity (and thus may be indicative of compromise) based on its primary and/or secondary attributes. For example, the analysis module 410 may determine that compromise is likely if an email account logs into the enterprise network 414 in an unusual location (e.g., China) or at an unusual time (e.g., 3 AM) based on a comparison to past sign-in events. As another example, the analysis module 410 may determine that compromise is likely if an email account transmits an email message that deviates from the characteristics of past emails transmitted by that email account (e.g., has no subject line, has a different signature, includes a link with no context in the body).

The analysis module 410 can make use of heuristics, neural networks, rules, decision trees (e.g., gradient-boosted decision trees), or ML-trained algorithms (e.g., decision trees, logistic regression, linear regression). Accordingly, the analysis module 410 may output discrete outputs or continuous outputs, such as a probability metric (e.g., specifying likelihood of compromise), a binary output (e.g., compromised or not compromised), an attack classification (e.g., specifying the type of scheme employed), etc.

For each email transmitted by an email account, the analysis module 410 may determine whether the email deviates from traits (e.g., behavioral traits or content traits) learned from past emails transmitted by the email account. The deviation may be a numerical value or percentage representing a delta between a trait and a corresponding feature extracted from the email. For example, if the trait specifies that emails are transmitted by Joe.Smith@Enterprise.com almost exclusively between 8 AM and 5 PM, then an email transmitted at 3 AM may be assigned a relatively high deviation value. However, if Joe.Smith@Enterprise.com sends emails between 5 PM and 8 AM approximately 20 percent of the time, then the deviation value will be lower than the previous example.

These deviation values can be fed by the analysis module 410 as input into one or more attack detectors, each of which can generate an output. Each attack detector may be a rules-based engine, heuristic engine, or ML model designed to detect possible instances of a given type of attack. For example, these deviation values may be fed into an ML model designed/trained to identify theft schemes. The analysis module 410 may flag the email account as possibly compromised if an indication is received from the attack detector(s) that a deviation threshold has been exceeded.

The remediation engine 412 may perform one or more remediation actions in response to the analysis module 410 determining that an email account may be compromised. The remediation action(s) may be based on the nature of the threat, the policies implemented by the enterprise, etc. These policies may be predefined or dynamically generated based on inference, analysis, or the data obtained from the enterprise network 414. Examples of remediation actions include moving emails generated by the compromised email account into a hidden folder (also referred to as a "quarantine folder") for further analysis, preventing the compromised email account from accessing resources on the enterprise network 414, sending notifications (e.g., to the actual employee, enterprise, or member of the security service), resetting the password of the compromised email account, ending all active sessions of the compromised email account, and resetting connections with services/databases accessible via the enterprise network 414.

The remediation engine 412 may provide results produced by the monitoring module or some other output (e.g., a notification that an email account may be compromised) to an electronic device 416. The electronic device 416 may be managed by the employee associated with the email account under examination, an individual associated with the enterprise (e.g., a member of the information technology department), or an individual associated with a security service. In some embodiments, the remediation engine 412 sends the output in a human-readable format for display on an interface accessible via the electronic device 416.

Some embodiments of the threat detection platform 400 include a training module 404 that operates to train the ML model(s) employed by the analysis module 410. For example, if the analysis module 410 is designed to apply ML model(s) to the email data, mail filter data, or sign-in data obtained from the enterprise network 414, the training module 404 can train the ML model(s) by feeding training data into those ML model(s). The training data could include labeled digital activities (e.g., emails that have been labeled as attacks or non-attacks), policies related to primary or secondary attributes (e.g., that sign-in events occurring in a given location are authentic due to the use of a virtual private network (VPN) service), etc. The training data may be employee- or enterprise-specific so that the ML model(s) are able to perform personalized analysis. In some embodiments, the training data ingested by the ML model(s) includes malicious emails that are representative of known instances of email account compromise. For example, these malicious emails may include language known to represent instances of fraud. As another example, these malicious emails may include links to URLs or attachments known to represent instances of phishing.

Threat Intelligence

Some enterprises may wish to receive intelligence about potential instances of email account compromise that have been discovered by the threat detection platform. Because the threat intelligence platform can monitor various types of data in real time, unique intelligence can be produced that allows abnormal behavior indicative of email account compromise to be detected more quickly, accurately, and consistently.

As discussed above, a threat detection platform may be designed to capture compromise signals gleaned from a variety of sources, including external sources and internal sources. Examples of compromise signals include Internet Protocol (IP) addresses, email addresses, URLs, domains, attachments, cryptocurrency addresses, etc. Normally, a separate database of compromise signals is generated for each enterprise due to the targeted nature of malicious emails generated by compromised email accounts. However, a shared database of compromise signals can be useful in several respects. For example, a shared database may be useful to a threat detection platform that has been tasked with monitoring the emails of an enterprise for which a database has not yet been compiled. A shared database may also be helpful in building a better understanding of the threats posed to enterprises since most enterprises experience relatively few instances of email account compromise (e.g., a large enterprise of several thousand employees may discover a couple of instances of email account compromise per year).

Moreover, the database could be provided to enterprises for ingestion into other security products, such as firewalls and security orchestration, automation, and response (SOAR) tools. For example, an enterprise may find it useful to provide compromise signals deemed to correspond to increased security risk to a management tool, such as a gateway, to help protect employees from future threats, poor choices, etc. As another example, an enterprise may identify email accounts associated with compromise signals for further examination.

As discussed above, the threat detection platform may be programmed to infer the threat posed by each compromise signal. For example, the threat detection platform might classify each compromise signal as being representative of low, moderate, or high risk to the security of the enterprise. Additionally or alternatively, the threat detection platform might classify each compromise signal as being representative of a reimbursement scheme, fraud scheme, or theft scheme.

Many enterprises may find it sufficient to examine compromised email accounts that have been surfaced by the threat detection platform. However, some enterprises have begun monitoring compromise signals in order to better address threats in real time. For instance, an enterprise may monitor compromise signals gleaned from internal emails by the threat detection platform to identify appropriate remediation actions, preventive measures, etc.

At a high level, the threat detection platform can be designed to:
Ingest intelligence from different sources such as:
Compromise signals derived from digital activities (e.g., links to malicious URLs embedded in internal emails);
Inferred compromise signals based on statistics of past attacks (e.g., the number of malicious emails generated by a given email account);
Threat information surfaced by other security products deployed by enterprises; and
Security professionals employed by enterprises; and
Export intelligence, for example, as a database to be used while examining digital activities or a feed to be ingested by other security products.

The threat detection platform may be designed to address compromise signals on a per-enterprise or per-employee basis. For example, a threat detection platform could maintain a first list of compromise signals that should not be observed in any internal emails and a second list of compromise signals that should only be observed in a subset of internal emails (e.g., those addressed to, or sent by, the finance department). As another example, a threat detection platform could maintain a list of compromise signals (e.g., specifying certain geographical locations) that should not be observed in any sign-in events. In some embodiments, the threat detection platform is able to place limits on each compromise signal to prevent permanent blacklisting. For example, the threat detection platform may discover an internal email that includes a link to a website that hosts a phishing page. In such a scenario, the threat detection platform may capture the website (and, more specifically, its URL) as a compromise signal for a specified period of time after which the threat detection platform can check whether the website is still hosting the phishing page.

Figure 5:
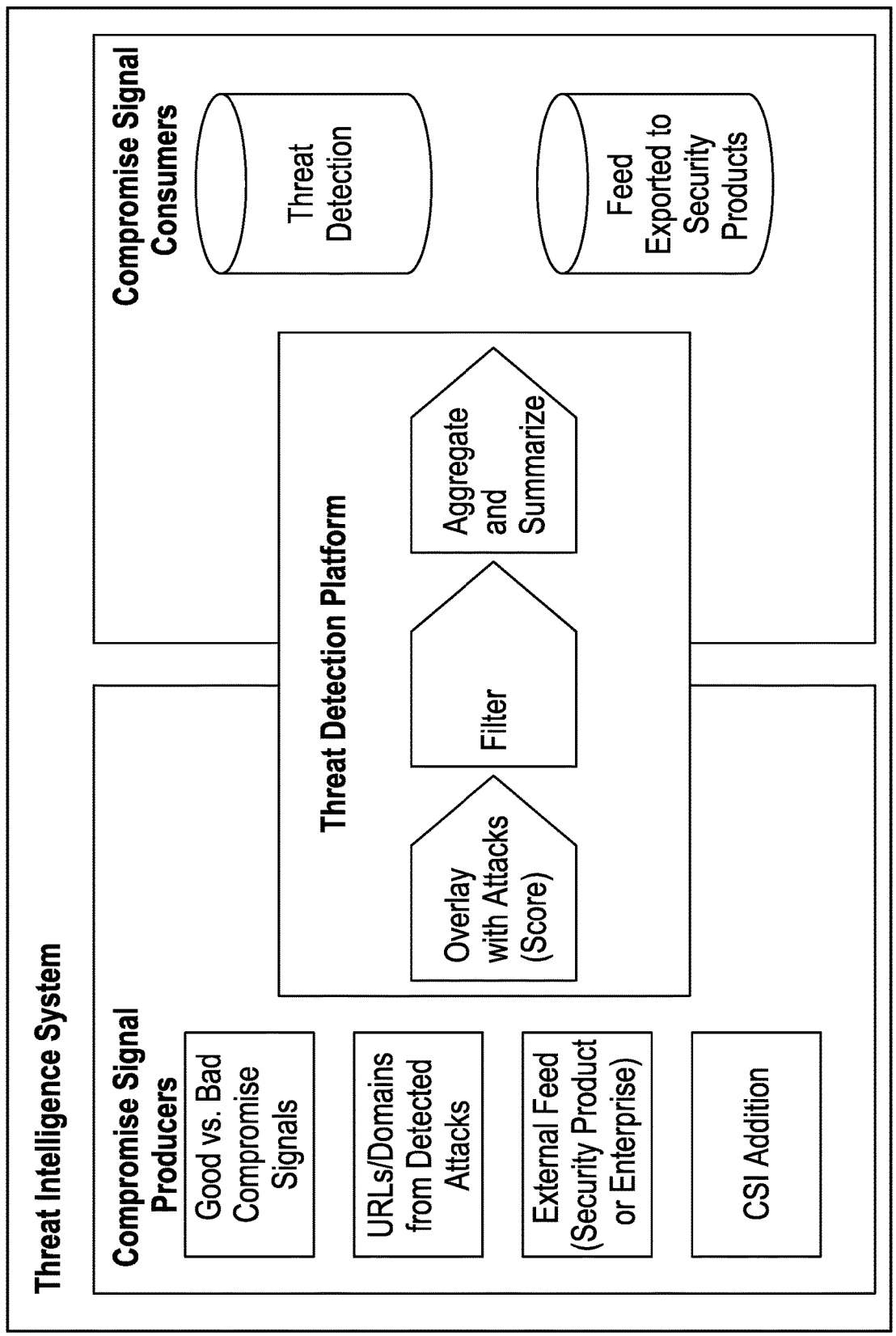
FIG. 5 includes a high-level diagram of a threat intelligence system of which the threat detection platform is a part.

FIG. 5 includes a high-level diagram of a threat intelligence system of which the threat detection platform is a part. As shown in FIG. 5, compromise signals can be produced, discovered, and/or inferred from several different types of data. These types of data include data related to emails (e.g., incoming emails or outgoing emails), mail filters, and sign-in events.

The threat detection platform may overlap the compromise signals with digital activities discovered, for example, by examining incoming and outgoing email. Thus, the threat detection platform may attempt to match the compromise signals with digital activities so that the score calculated for each digital activity can be attributed to the appropriate compromise signal(s). Thereafter, the threat detection platform may filter the compromise signals (e.g., based on the scores that have been attributed to them) and then use the filtered compromise signals to further bolster its ability to detect threats.

As discussed above, the threat detection platform may utilize its ecosystem of multiple enterprises to offer federated capabilities. For example, the threat detection platform could build a central database across its entire environment that includes a list of safe vendors and learn what constitutes normal behavior for each safe vendor. In particular, the central database may specify the email addresses used by each safe vendor, the individual(s) responsible for sending invoices for each safe vendor, the invoicing software used by each safe vendor, the routing/bank account numbers of each safe vendor, the location from which the invoices of each safe vendor originate, etc. As another example, the threat detection platform could build a central database across its entire environment that includes a list of entities that are notable in terms of the type, strength, or frequency of attacks by those entities. Examples of such entities may include IP addresses, URLs, domains, and email addresses. Such a central database may be helpful as it permits the threat detection platform to apply knowledge gained from one enterprise across the entire ecosystem.

Generally, the threat detection platform is designed so that datasets can be generated, processed, and added to the pipeline in which ML models are developed, trained, etc. Each dataset may be readily reproducible, updatable, searchable, or viewable. As noted above, the datasets may be edited through interfaces generated by the threat detection platform. For example, a human may label different compromise signals in a dataset for the purpose of training an ML model. Examples of databases that may be accessible to the threat detection platform include:

- A vendor database that includes a set of vendors from which enterprises receive emails. Examples of vendors include American Express®, Chase®, Lloyd's Bank®, Microsoft®, etc. In the vendor database, each vendor may be associated with a canonical name, a list of safe domains (e.g., domains that emails link to, domains that emails are received from, domains with which the vendor works), a list of alias names, a list of common expressions (e.g., "Employee via Third-Party Service"), or appropriate signifiers. The threat detection platform may use the vendor database to whitelist and/or blacklist extracted signals.
- A domain database that includes a set of top-level domains. For each domain, the threat detection platform can track additional information. For example, the threat detection platform may establish whether each domain has been whitelisted as a safe domain, whether the domain corresponds to a hosting service, whether the domain is a redirector, etc. Moreover, the domain database may specify what, if anything, Google's SafeBrowsing API says about the domain, how often the domain is included in emails received by the enterprise, how much labeled data can be seen, what cached Whois data is available for the domain, etc.
- A Whois registrant database that includes information about each registrant derived from Whois data stored in the domain database.
- A URL database that includes URL-level information derived from links included in emails received and/or transmitted by an enterprise. For each URL, the threat detection platform may populate an entry with a model indicative of URL suspiciousness, data regarding URL quality (e.g., data from phishtank.com), data acquired via Google's SafeBrowsing API, or statistics regarding how often the URL is seen in emails received and/or transmitted by the enterprise.
- An employee database that includes information on the employees of an enterprise. Generally, the threat detection platform maintains a separate employee database for each enterprise whose security is being monitored. For each employee, the threat detection platform may populate an entry with an enterprise identifier, name, employee identifier, alias names, known email addresses (e.g., enterprise email addresses and personal email addresses that have been verified), Lightweight Directory Access Protocol (LDAP) role, the number of suspected attacks observed against the employee's email account, or the number of suspected attacks originated by the employee's email account.
- A label database (also referred to as a "feedback database") that includes labelled data to be used to build aggregated feedback for each enterprise, employee, etc. An entry could include aggregated feedback for an email address, domain, link, etc. For example, an entry in the label database may specify that 15 out of 30 emails from A@exploit.com have been labeled as positive for attacks, or that 10 out of 11 emails containing a link to http://xyz.com have been labeled as positive for attacks.

As discussed above, an enterprise may monitor compromise signals gleaned by the threat detection platform (e.g., from digital activities such as transmissions of intra-enterprise emails) to identify appropriate remediation actions, preventive measures, etc. By exposing compromise signals in a rapid manner, the threat detection platform can alert enterprises so that security postures can be improved to counteract the threat posed by a compromised email account. In some embodiments, the threat detection platform allows users to extract and/or export compromise signals. For example, an enterprise may export information (also referred to as "threat intelligence") related to these compromise signals into a management tool to improve its ability to detect, identify, and address these threats in the future. The threat detection platform may format the information (e.g., into a machine-readable form) so that it is readily shareable. For example, the information may be formatted in accordance with the Structured Threat Information Expression (STIX) and Trusted Automated Exchange of Indicator Information (TAXII) specifications. Generally, STIX will indicate what type of threat intelligence is formatted, while TAXII will define how the underlying information is relayed.

A schema may be employed to ensure that threat intelligence is accounted for in a consistent manner. For a given digital activity, the schema may indicate:

- An observable output (e.g., the email account at issue);
- A compromise signal (e.g., the URL, IP address, domain, mail filter, or sign-in event under consideration);
- A classification (e.g., whether the compromise signal is representative of a reimbursement scheme, fraud scheme, or theft scheme);
- A severity (e.g., whether compromise of the email account poses a low, medium, high, or very high threat to the security of the enterprise);
- A confidence metric (e.g., a score on a 0-100 scale indicating confidence that the compromise signal corresponds to evidence of email account compromise);
- An observed time; and/or
- A Traffic Light Protocol (TLP) metric indicating how widely the underlying information should be shared.

Figure 6:
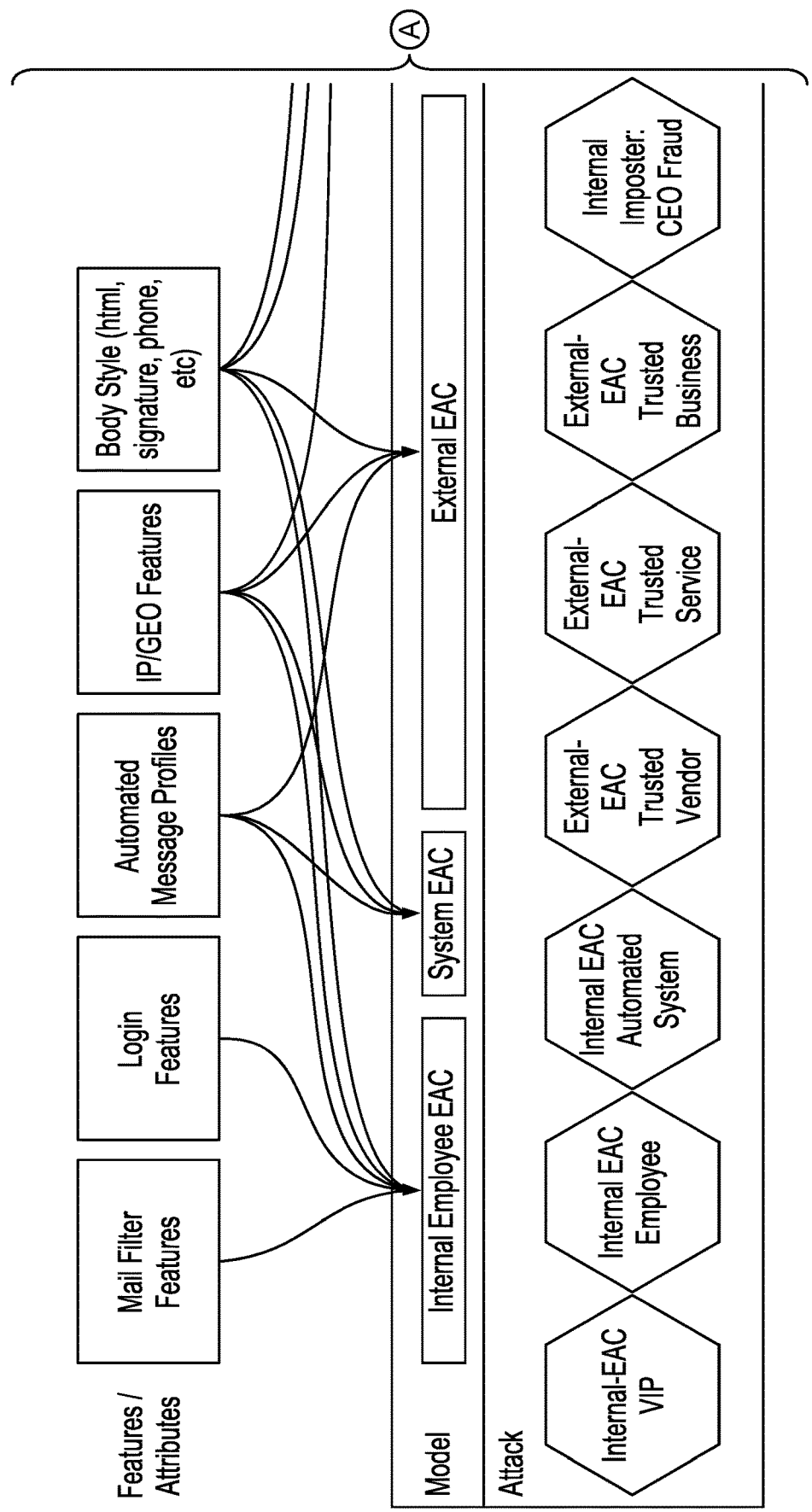
FIG. 6 illustrates how a threat detection platform may generate, derive, or infer attributes from data related to the digital activities performed with email accounts associated with employees of an enterprise, provide those attributes to machine learning (ML) models as input, and then examine the outputs produced by those ML models to determine whether the security of the enterprise is threatened.

FIG. 6 illustrates how a threat detection platform may generate, derive, or infer attributes from data related to the digital activities performed with email accounts associated with employees of an enterprise, provide those attributes to ML models as input, and then examine the outputs produced by those ML models to determine whether the security of the enterprise is threatened. As shown in FIG. 6, the attributes could be provided as input to a variety of ML models associated with different types of attacks. Here, for example, features related to the sign-in events (also referred to as "login events") of an email account could be fed into ML models designed to detect internal email account compromise.

Figure 7:
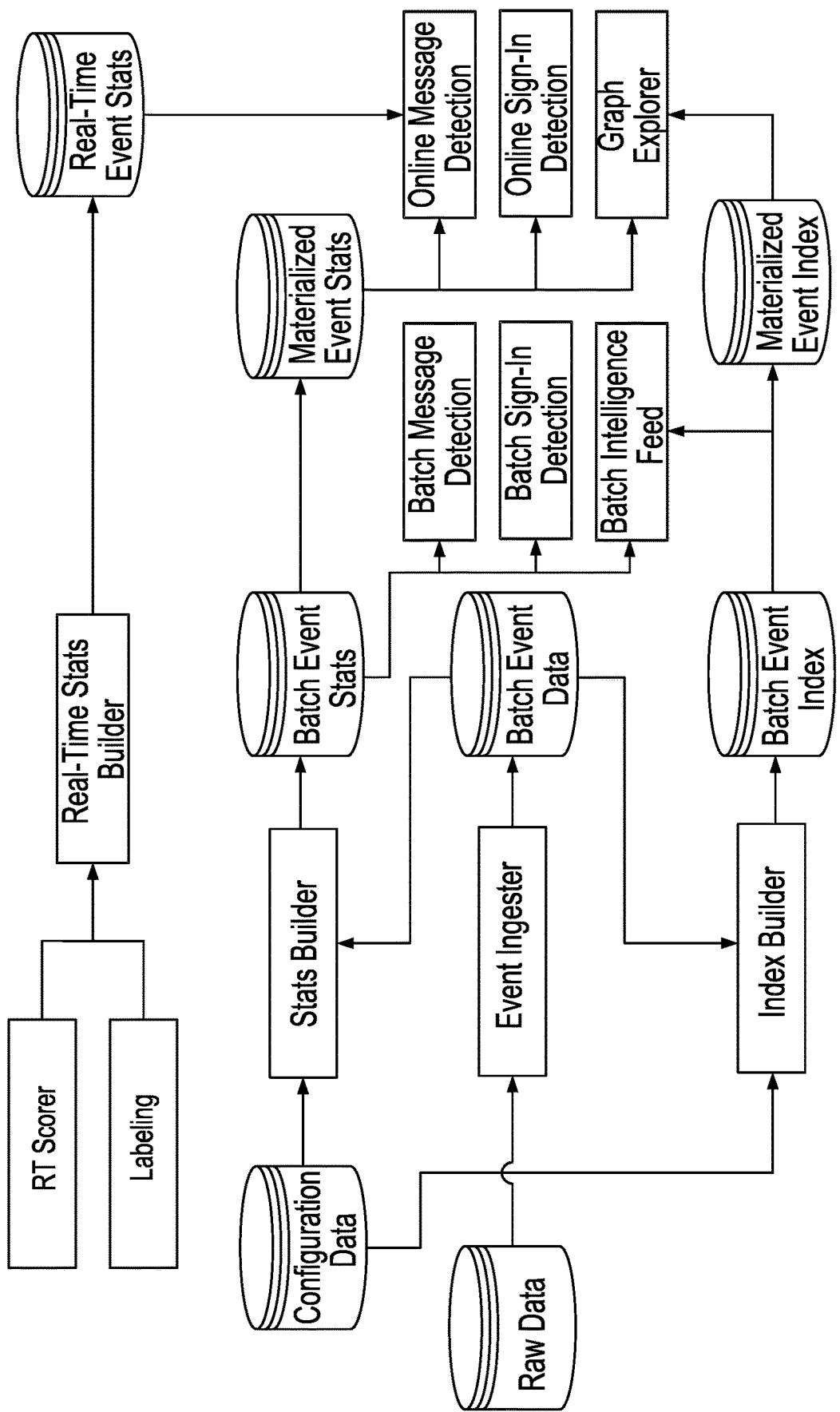
FIG. 7 includes a high-level illustration of a process by which a threat detection platform can perform threat intelligence.

FIG. 7 includes a high-level illustration of a process by which a threat detection platform can perform threat intelligence. As shown in FIG. 7, data can be obtained from several different sources. Here, the threat detection platform obtains configuration data and raw data. Configuration data may include instructions/rules that indicate whether the threat detection platform should "listen" for digital activities performed with a given email account. Meanwhile, raw data can include information pertaining to the digital activities performed with the given email account.

The event ingester module (or simply "event ingester") may be responsible for converting the raw data into an internal schema for digital activities (also referred to as "events"). The schema may be designed to hold various digital activities regardless of type (e.g., reception/transmission of email, sign-in event, creation of mail filter). The stats builder module (or simply "stats builder") may be responsible for mapping attributes corresponding to an interval of time to counts of digital activities.

Figure 8:
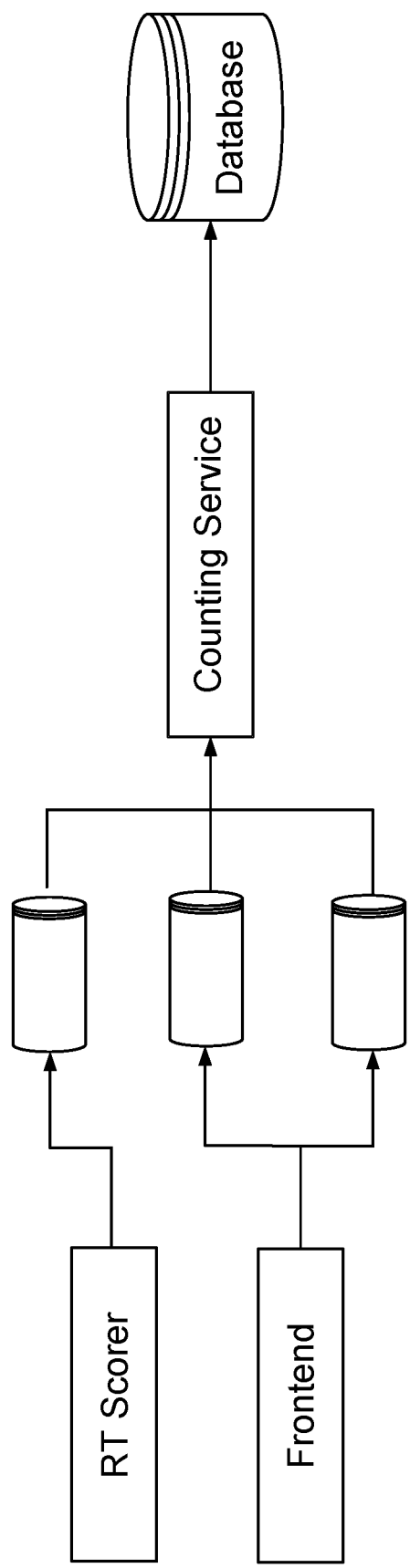
FIG. 8 includes a high-level illustration of a process by which a threat detection platform can "productionalize" a signature to be used to determine the threat posed by an email account.

FIG. 8 includes a high-level illustration of a process by which a threat detection platform can "productionalize" a signature to be used to determine the threat posed by an email account. Initially, a real-time scoring module (also referred to as the "RT scorer") can process raw data related to the digital activities of the email account. The processed data associated with each digital activity can be passed to a counting service (also referred to as a "counting system") that converts the processed data into an event.

Moreover, each digital activity labeled through the frontend (e.g., via an interface generated by the threat detection platform) can be passed to the counting service, which converts the labeled digital activity into an event. The labels may indicate whether the digital activities represent a threat to the security of the enterprise with which the email account is associated. For example, the labels may indicate that sign-in events that occur in certain geographical locations are authentic (and thus should not be flagged as possible instances of email account compromise). Accordingly, the events derived from the labeled digital activities may be associated with a risk metric.

The events created by the counting service can be stored in a database (e.g., a Redis distributed database). This data may be formatted so that it can be easily queried for signatures. The term "signature," as used herein, may refer to the combination of attributes (e.g., primary attributes and/or secondary attributes) associated with a digital activity that collectively define an event. Thus, queries could be submitted, for example, for signatures determined not to represent a threat, signatures having a given attribute (or combination of attributes), etc.

Employee Account Compromise

As discussed above, a threat detection platform can be designed to discover potential instances of email account compromise in order to identify threats to an enterprise. To accomplish this, the threat detection platform may examine data related to the digital activities performed with email accounts corresponding to some or all of the employees of the enterprise. Examples of digital activities include the reception of an incoming email, transmission of an outgoing email, creation of a mail filter, and act of signing/logging into the email account, and identification of an identity risk event (e.g., as determined by Microsoft Office® 365). Accordingly, embodiments of the threat detection platform may examine data related to mail filters (e.g., by identifying the mail filters employees have set up to filter incoming email), identity risk events (e.g., by identifying the alerts created by Microsoft Office® 365), security alerts (e.g., by identifying the per-employee security alerts generated by Microsoft Office® 365), sign-in events (e.g., by identifying the geographical location of each sign-in event), and email-based attacks (e.g., by examining whether compromise signals are included in external emails and/or internal emails).

Thus, the threat detection platform may examine data related to a variety of digital activities performed with an email account in order to determine the likelihood that the email account has been compromised. Such an approach enables the threat detection platform to detect instances of email account compromise more quickly, accurately, and consistently.

Figure 9:
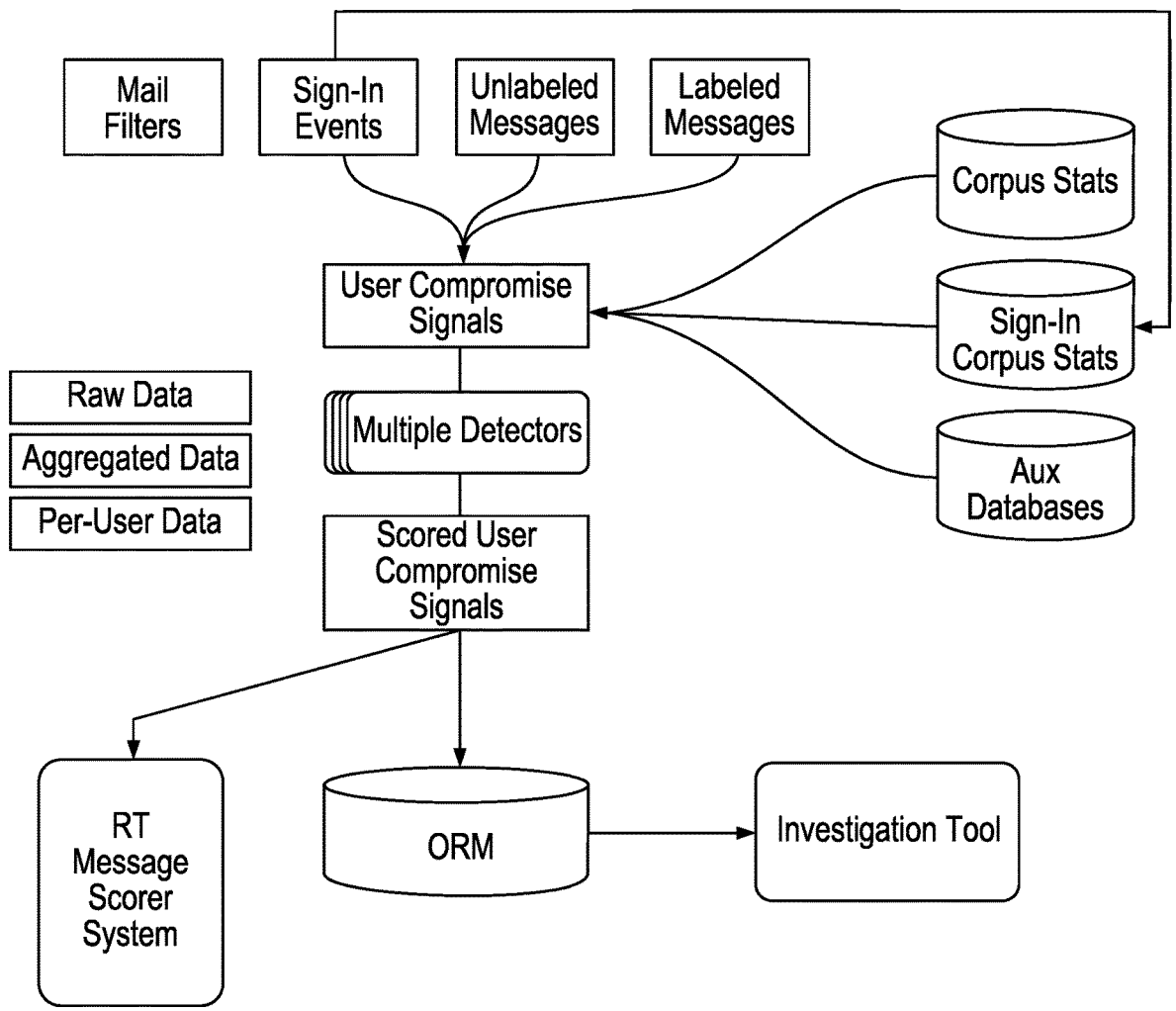
FIG. 9 includes a high-level illustration of a process by which a threat detection platform can detect potential instances of email account compromise.

FIG. 9 includes a high-level illustration of a process by which a threat detection platform can detect potential instances of email account compromise. At a high level, the threat detection platform can learn what behaviors should be considered normal on a per-employee or per-enterprise basis by identifying behavioral traits (e.g., where sign-in events occur, when emails are generated, who emails are addressed to) and then employing personalized learning to discover deviations in these behaviors. Here, for example, the threat detection platform examines raw data (e.g., in the form of mail filters, sign-in events, unlabeled messages, and labeled messages) and aggregated data (e.g., in the form of corpus statistics, sign-in corpus statistics, and auxiliary databases) to discover signals that indicate the email account may be compromised. Generally, these "compromise signals" correspond to deviations in the behaviors of the email account under examination.

Then, the threat detection platform can employ one or more detectors to score each compromise signal. Each score may be representative of how highly the compromise signal corresponds to the likelihood that the email account has been compromised. Accordingly, compromise signals may be discovered and scored on a per-employee basis.

The threat detection platform can detect instances of compromise by comparing digital activities involving a given email account to the scored compromise signals and/or a profile built from past digital activities. For instance, the threat detection platform may discover, based on the location and/or frequency of sign-in events, that an email account may have become compromised. As an example, assume that the threat detection platform discovers that a sign-in event for a given email account has occurred in San Francisco, Calif., at 7:05 PM. If the threat detection platform discovers that the given email account is then involved in another sign-in event in Chicago, Ill., at 7:30 PM, the threat detection platform may identify the given email account as possibly compromised.

Note, however, that the threat detection platform need not necessarily take action immediately. For instance, the threat detection platform may determine what remediation actions, if any, to take based on which compromise signals indicate abnormal behavior, the scores of those compromise signals, etc. As an example, the threat detection platform may take immediate action to prevent further accesses of the email account if the relevant compromise signal(s) have high scores, but the threat detection platform may simply continue to monitor the email account if the relevant compromise signal(s) have low scores.

Such an approach allows the threat detection platform to infer whether an email account has been compromised based on the digital activities performed with that email account. In some embodiments, the threat detection platform employs a set of heuristics that has been trained using a series of training emails that have been labelled as malicious (e.g., by the enterprise or security service). These training emails may be fictional examples or actual examples of past emails generated by compromised email accounts. When applied to emails generated by an email account, the set of heuristics can be helpful in determining the riskiness of a given email based on its content and context.

Instances of email account compromise (as well as the digital activity that caused concern) may be surfaced to an investigation tool for review. This could be done continually (e.g., as the digital activity is processed and scored) or periodically (e.g., every 3, 6, 12, or 24 hours). Each potential instance of email account compromise can be reviewed by an individual, who may use information not available to the threat detection platform (e.g., information regarding the employee such as vacation details) to make a final determination. FIG. 10 provides an example matrix of the decisions that may be made by a threat detection platform as it discovers compromise signals corresponding to digital activities.

Figure 11:
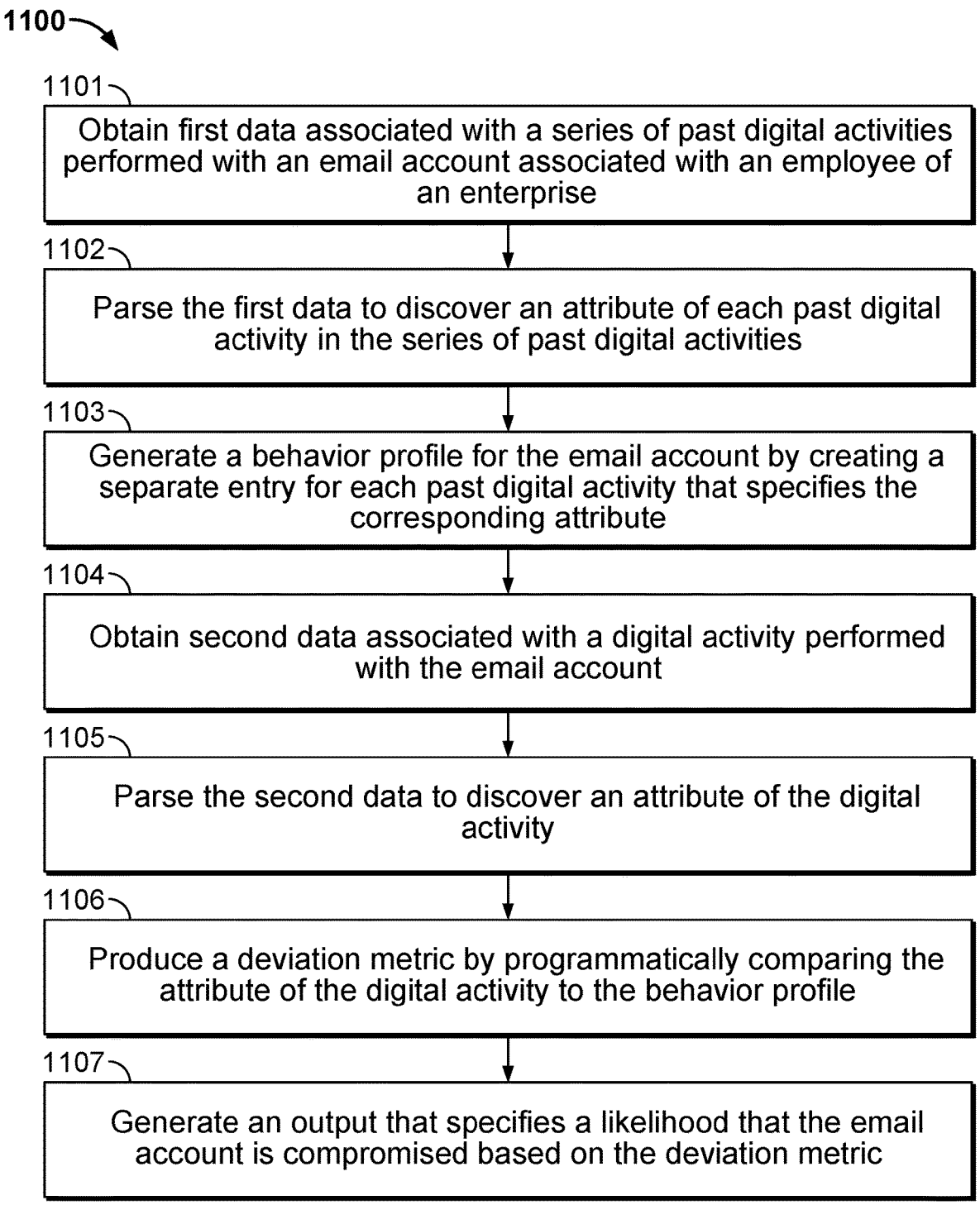
FIG. 11 depicts a flow diagram of a process for determining the likelihood that an email account belonging to an employee of an enterprise has been compromised.

FIG. 11 depicts a flow diagram of a process 1100 for determining the likelihood that an email account belonging to an employee of an enterprise has been compromised. Initially, a threat detection platform can obtain a first set of data ("first data") associated with a series of past digital activities performed with the email account (step 1101). As discussed above, the first data may be obtained from a storage medium via an API. In embodiments where the first data is distributed amongst multiple storage mediums, the threat detection platform may establish a separate connection with each storage medium via a corresponding API. The series of past digital activities can include receptions of incoming emails, transmissions of outgoing emails, creations of mail filters, and/or occurrences of sign-in events. Generally, the first data corresponds to a recent past interval of time (e.g., the last 3, 6, or 12 months), but the first data could correspond to any past interval of time.

The threat detection platform can parse the first data to discover an attribute of each past digital activity in the series of digital activities (step 1102). The attribute may be a primary attribute or a secondary attribute. For example, for the transmission of an outgoing email, the threat detection platform may identify the email address of each recipient. As another example, for the occurrence of a sign-in event, the threat detection platform may identify the time and/or geographical location of the sign-in event.

The threat detection platform can then generate a behavior profile (also referred to as a "historical profile" or "communication profile") for the email account by creating a separate entry for each past digital activity that specifies the corresponding attribute (step 1103). In some embodiments, the behavior profile is representative of a series of predefined schemas that have been populated based on the first data. In such embodiments, the threat detection platform may examine the first data to identify the information related to each past digital activity, and then the threat detection platform may define each past digital activity as a separate event by populating a predefined schema with the corresponding information. The predefined schema may be designed to accommodate various types of digital activities.

Thereafter, the threat detection platform can obtain a second set of data ("second data") associated with a digital activity recently performed with the email account (step 1104). Generally, the second data is obtained in real time while, or shortly after, the digital activity is being performed so that the threat detection platform can take preventive action if necessary. The threat detection platform can parse the second data to discover an attribute of the digital activity (step 1105). For example, the threat detection platform may identify the email address of each recipient if the digital activity is the transmission of an outgoing email, and the threat detection platform may identify the time and/or geographical location if the digital activity is the occurrence of a sign-in event.

In some embodiments, the threat detection platform produces a deviation metric based on a programmatic comparison of the attribute of the digital activity to the behavior profile (step 1106). More specifically, the threat detection platform may programmatically compare the attribute of the digital activity to the attributes listed in some or all of the entries in the behavior profile. For example, the threat detection platform may only programmatically compare the attribute of the digital activity to entries in the behavior profile that correspond to the same type of digital activity. Thus, attributes of sign-in events may be compared to attributes of past sign-in events, attributes of outgoing emails may be compared to attributes of past outgoing emails, etc. Any deviations may be provided to an ML model trained to determine whether the deviations are representative of email account compromise.

Moreover, the threat detection platform may generate an output that specifies a likelihood that the email account is compromised based on the deviation metric and/or the digital activity itself (step 1107). The output can be handled by the threat detection platform in a variety of different ways. For example, the threat detection platform may transmit a notification to the employee or an administrator associated with the enterprise responsive to determining that the digital activity represents a particular type of compromise scheme. As another example, the threat detection platform may automatically determine an appropriate remediation action to perform on behalf of the enterprise responsive to determining that the likelihood of compromise exceeds a threshold. The threshold may be part of a series of thresholds representative of different levels of risk to the enterprise.

Figure 12:
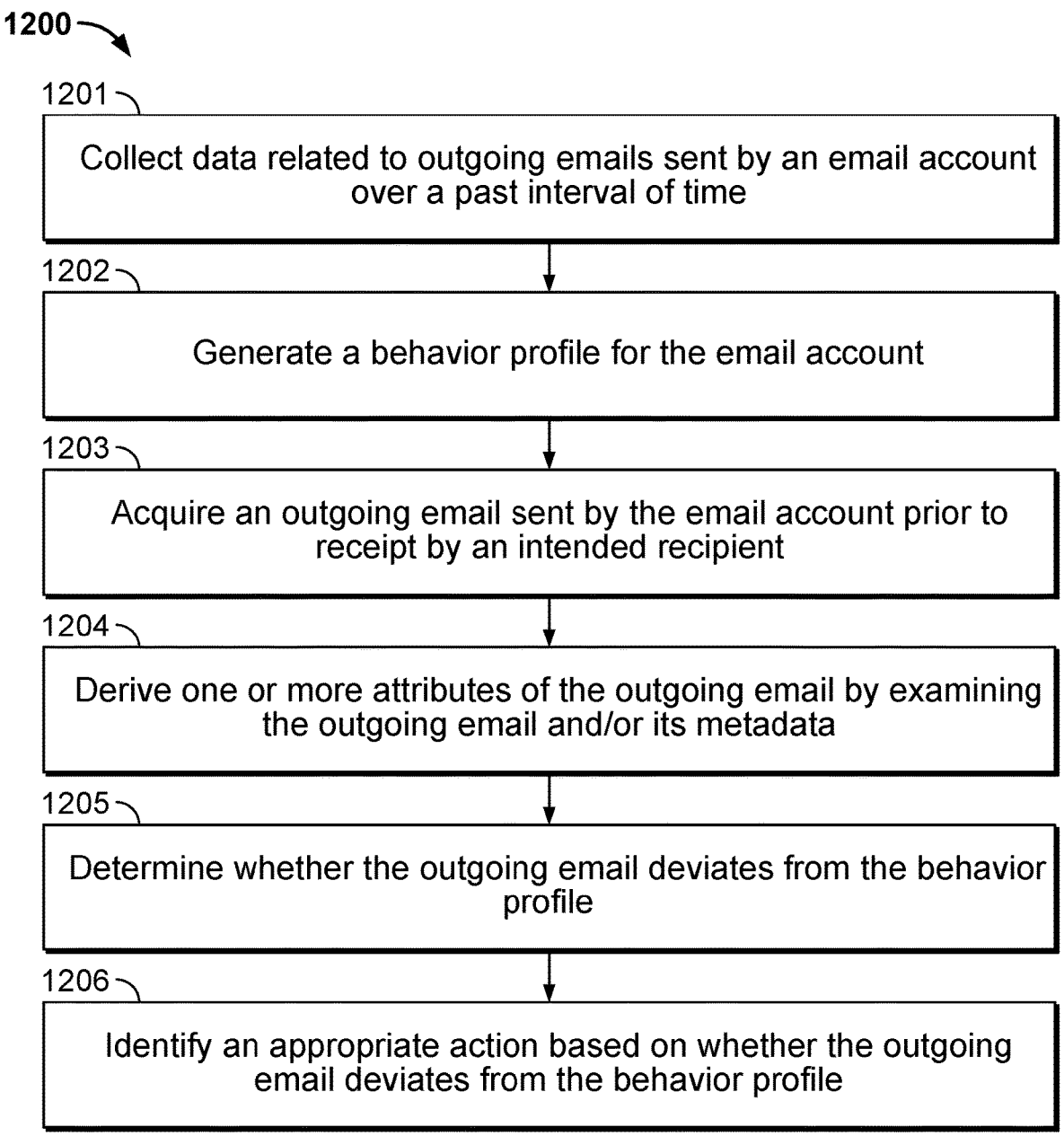
FIG. 12 depicts a flow diagram of a process for determining the likelihood that an email account has been compromised based on the content and/or context of outgoing emails produced by the email account.

FIG. 12 depicts a flow diagram of a process 1200 for determining the likelihood that an email account has been compromised based on the content and/or context of outgoing emails produced by the email account. Initially, a threat detection platform can collect data associated with outgoing emails sent by the email account over a past interval of time (step 1201). As discussed above, the data may be collected directly from the enterprise or a service used by the enterprise (e.g., Microsoft Office® 365).

Then, the threat detection platform can generate a behavior profile for the email account (step 1202). For example, the threat detection platform may derive at least one attribute of each outgoing email from the data and then populate a data structure that represents the behavior profile with the derived attributes. These attributes can include the geographical origin, sender identity, sender email address, recipient identity, recipient email address, subject, body, attachments, etc. Moreover, the threat detection platform can establish patterns and/or traits that the email account consistently exhibits. For example, the threat detection platform may determine whether the email account consistently uses the same signature or formatting. As another example, the threat detection platform may determine whether the email account ever leaves subject lines blank or inserts links into the body without any context.

Thereafter, the threat detection platform can acquire an outgoing email sent by the email account (step 1203). Generally, the outgoing email is acquired prior to receipt by the intended recipient(s). Accordingly, the threat detection platform may divert some or all outgoing email into a quarantine folder for examination. The threat detection platform can derive one or more attributes of the outgoing email by examining the outgoing email and/or its metadata (step 1204). For example, the threat detection platform may identify the email addresses of all intended recipients, or the threat detection platform may identify any URLs (or links to URLs) embedded in the body of the outgoing email or an attachment.

The threat detection platform can determine whether the outgoing email deviates from the behavior profile for the email account (step 1205). For example, the threat detection platform may programmatically compare the one or more attributes to each entry in the data structure corresponding to a past outgoing email. Then, the threat detection platform can identify an appropriate action based on whether the outgoing email deviates from the behavior profile (step 1206). If the threat detection platform determines that the outgoing email does not deviate from the behavior profile, then the threat detection platform may forward the outgoing email to a mail server or a corporate mail system for transmission to the intended recipient(s). However, if the threat detection platform determines that the outgoing email does deviate from the behavior profile, then the threat detection platform may identify the email account as possibly being compromised. For example, the threat detection platform may notify an administrator that the email account may be compromised. The administrator may be associated with an enterprise responsible for managing the email account or a security service employed by the enterprise. As discussed above, in some embodiments the threat detection platform enables the administrator to manually address the threat posed by the email account, while in other embodiments the threat detection platform automatically addresses the threat posed by the email account on behalf of the administrator.

Unless contrary to possibility, these steps could be performed in various sequences and combinations. For example, a threat detection platform may be designed to address the threat posed by a compromised email account by performing a remediation action and notify an administrator of the compromised email account so that manual action can also be taken.

Other steps could also be included in some embodiments. For example, the processes 1100, 1200 of FIGS. 11-12 may be continuously or periodically performed over time so that the behavior profile is updated as digital activities are performed with the email account. This ensures that the threat detection platform can account for small adjustments in the behavior of the email account over time without generating false positives. Said another way, adjusting the behavior profile over time ensures that the threat detection platform is less likely to determine that the email account is compromised due to abnormal behavior when it is not actually compromised. As another example, all digital activities performed with an email account under investigation for possible compromise may be scored and, in some instances, attached to the file maintained for the investigation. Further information on scoring digital activities can be found in Patent Cooperation Treaty (PCT) Application No. PCT/US2019/67279.

Figure 13:
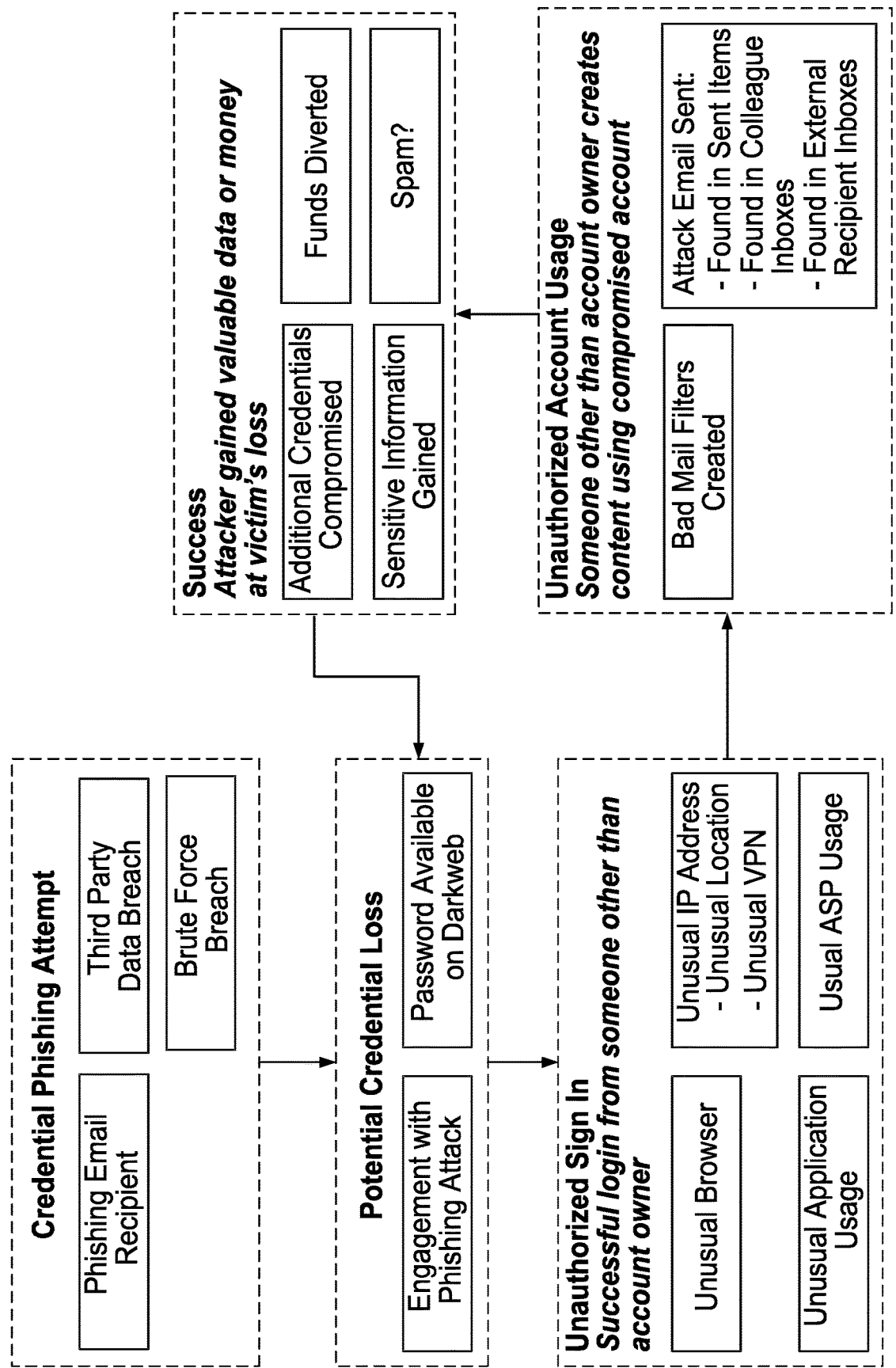
FIG. 13 depicts an example of a framework for discovering instances of email account compromise on behalf of enterprises.

FIG. 13 depicts an example of a framework for discovering instances of email account compromise on behalf of enterprises (also referred to as "customers"). Since enterprises may have different appetites for the information regarding possible instances of email account compromise, the threat detection platform may be designed to create easily understandable menus through which enterprises can specify the amount of information that is desired. For example, a first enterprise ("Client A") may have set their account to create alerts for all potential losses of credentials for email accounts and successful attacks discovered by the threat detection platform. However, a second enterprise ("Client B") may have set their account to only create alerts for instances of unauthorized email account usage. The threat detection platform may also be designed to offer readily understandable summaries of the threat state. These summaries may be based on the preferences specified by each enterprise through the menus. Here, for example, summaries for Client A may include more detailed information than summaries for Client B since Client A has indicated a greater interest in knowing the threat state.

Figure 14:
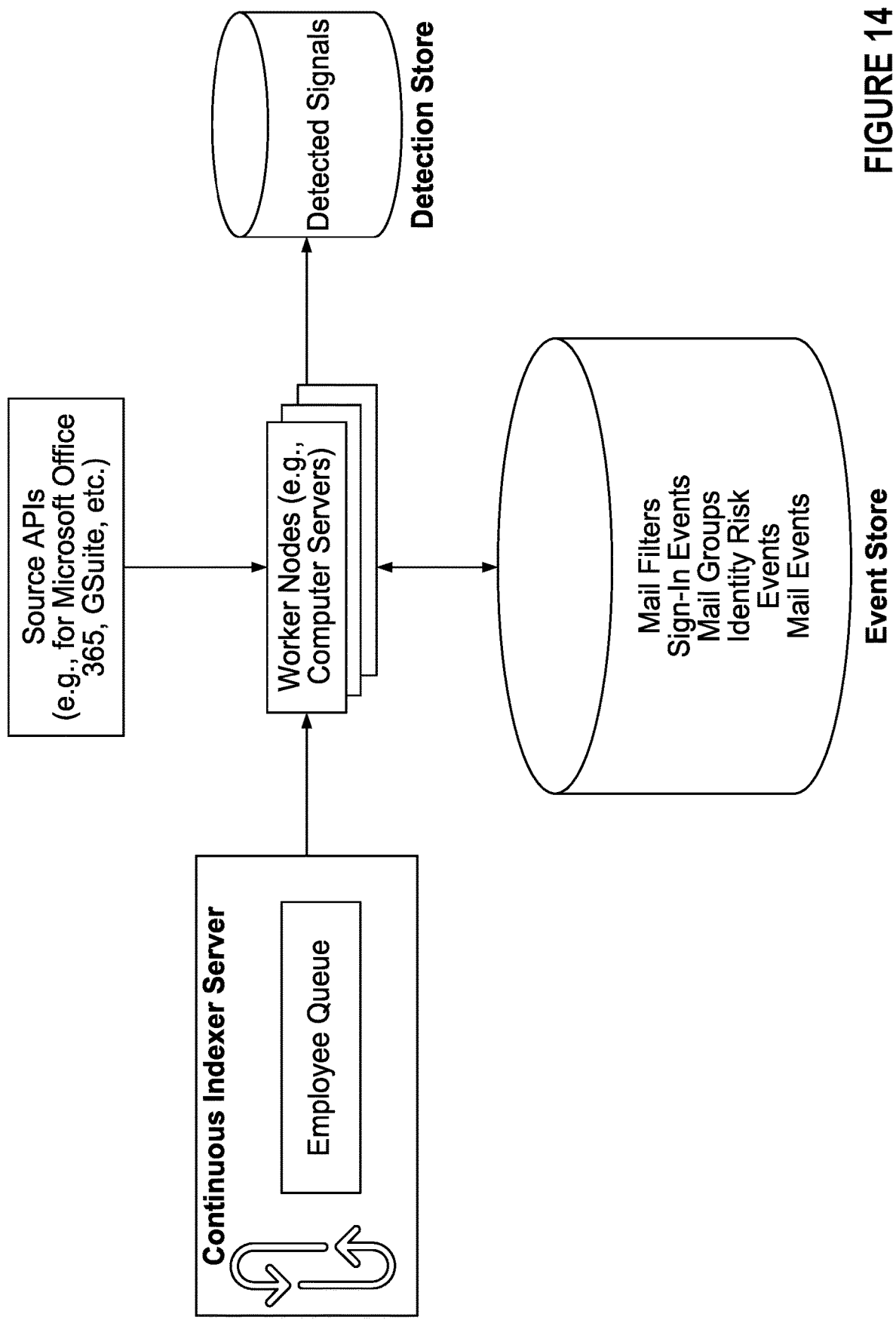
FIG. 14 depicts an example of a continuous indexer server designed to quickly retrieve information related to all digital activities performed with a given email account over a specified interval of time.

Some information retrieval mechanisms are not good at retrieving various types of data and then simultaneously or sequentially processing jobs that rely on this data. One benefit of a more flexible information retrieval mechanism is that the threat detection platform can more easily prioritize certain employees (e.g., recipients of phishing messages). Ideally, this flexible information retrieval mechanism should be able to quickly retrieve information related to all digital activities performed with a given email account, regardless of where that information is located, the types of digital activities, etc. FIG. 14 depicts an example of a continuous indexer server designed with these goals in mind. The continuous indexer server may be an always-on server that iterates through a set of employees that the threat detection platform wants to fetch digital activities for. Iteration may be done in order of priority (e.g., based on priority measures assigned by the threat detection platform). Priority may be based on the time at which each employee is identified by the threat detection platform, or priority may be based on the volume, nature, or type of digital activities that prompted the threat detection platform to become interested in each employee. For example, the threat detection platform may prioritize those employees whose activity has increased more than a predetermined amount over a preceding interval of time (e.g., a day, week, or month).

Each employee may be considered a work item by the continuous indexer server. Each work item may be queued with a fetch time and then dequeued by the conclusion of that fetch time. The fetch time defines the interval of time for which information regarding digital activities is retrieved for examination. As discussed above, information regarding digital activities may be obtained from a source (e.g., a service such as Microsoft Office 365 or GSuite) via an API. Information regarding digital activities could also be acquired from (or saved to) an event store managed by the threat detection platform when more extensive detection is deemed necessary. The fetch time may be determined based on the likelihood that the email account has been compromised. For example, employees who have received phishing messages may be watched for 15 minutes, while regular employees (i.e., those employees who are not involved in any known risk events) may be watched for 120 minutes.

The continuous indexer server can be sharded by hash (e.g., employee identifier) to distribute work items among "N" nodes. These nodes may be, for example, different computer servers or virtual machines. For example, if the threat detection platform is interested in examining the digital activities performed with 12 email accounts, then 4 work items may be distributed to a first server, 4 work items may be distributed to a second server, and 4 work items may be distributed to a third server. Note, however, that each server need not necessarily be assigned the same number of work items. For example, the distribution of work items may depend on the fetch times associated with those work items. Suspicious events and detection results can be persisted in a different datastore that allows for fine-grained and low-latency retrieval. Moreover, persisting this data in a different datastore allows the data to be made accessible to an external computing device (e.g., via an API) or an internal detection improvement system.

Automated Cross-Checking of IP Addresses

As discussed above, a threat detection platform can be designed to identify instances of email account compromise where an attacker has gained access to an email account and then performed unauthorized digital activities with that account. These events may also be referred to as "account takeover operations" or "account takeover activities." When the threat detection platform discovers an account takeover activity, it faces a question, namely, how to circumvent or address the threat posed by the attacker in a meaningful way.

Assume, for example, that the threat detection platform discovers an initial account takeover activity on behalf of an enterprise. In this situation, the threat detection platform may examine digital activities performed with email accounts associated with other enterprises in order to catch potential account takeover activities performed by the same attacker. For instance, the threat detection platform may examine those digital activities to determine whether any involve the IP address that is associated with the initial account takeover activity.

Accordingly, the threat detection platform may automatically identify digital activities as being potentially indicative of account takeover when a given attribute associated with a recent malicious account takeover activity is observed. Such an approach may be referred to as "forward detection." Additionally or alternatively, when a digital activity is marked malicious, the threat detection platform may search through past digital activities to identify those that share an attribute in common with the malicious digital activity. Such an approach may be referred to as "backward detection." For the purpose of illustration, embodiments may be described in the context of IP addresses; however, those skilled in the art will recognize that the approach is similarly applicable to other attributes.

Forward and backward detection may be useful for detecting threats across multiple enterprises using a shared knowledgebase. Accordingly, while the threat detection platform may discover account takeover activity on behalf of one enterprise, the threat detection platform may use that knowledge to identify similar threats to other enterprise(s). At a high level, the threat detection platform may have two goals when addressing account takeover activity. First, when a digital activity associated with an IP address is deemed malicious, the threat detection platform may identify all digital activities involving the IP address as malicious for a future interval of time (e.g., 7 days, 14 days, 30 days). Second, the threat detection platform may identify all past digital activities occurring over a past interval of time (e.g., 7 days, 14 days, 30 days) that involved the IP address. The future interval of time may be the same duration as the past interval of time, or the future interval of time may be a different duration than the past interval of time.

One item that must be accounted for by the threat detection platform is time delay. Generally, attackers will use IP addresses for limited periods of time. As such, the threat detection platform may avoid creating blacklists and instead make data-driven decisions based on analysis of recent digital activities. Signatures represent a good choice as they can be readily computed and maintained. As noted above, the term "signature," as used herein, may refer to the combination of attributes associated with a digital activity that collectively define an event.

Figure 15:
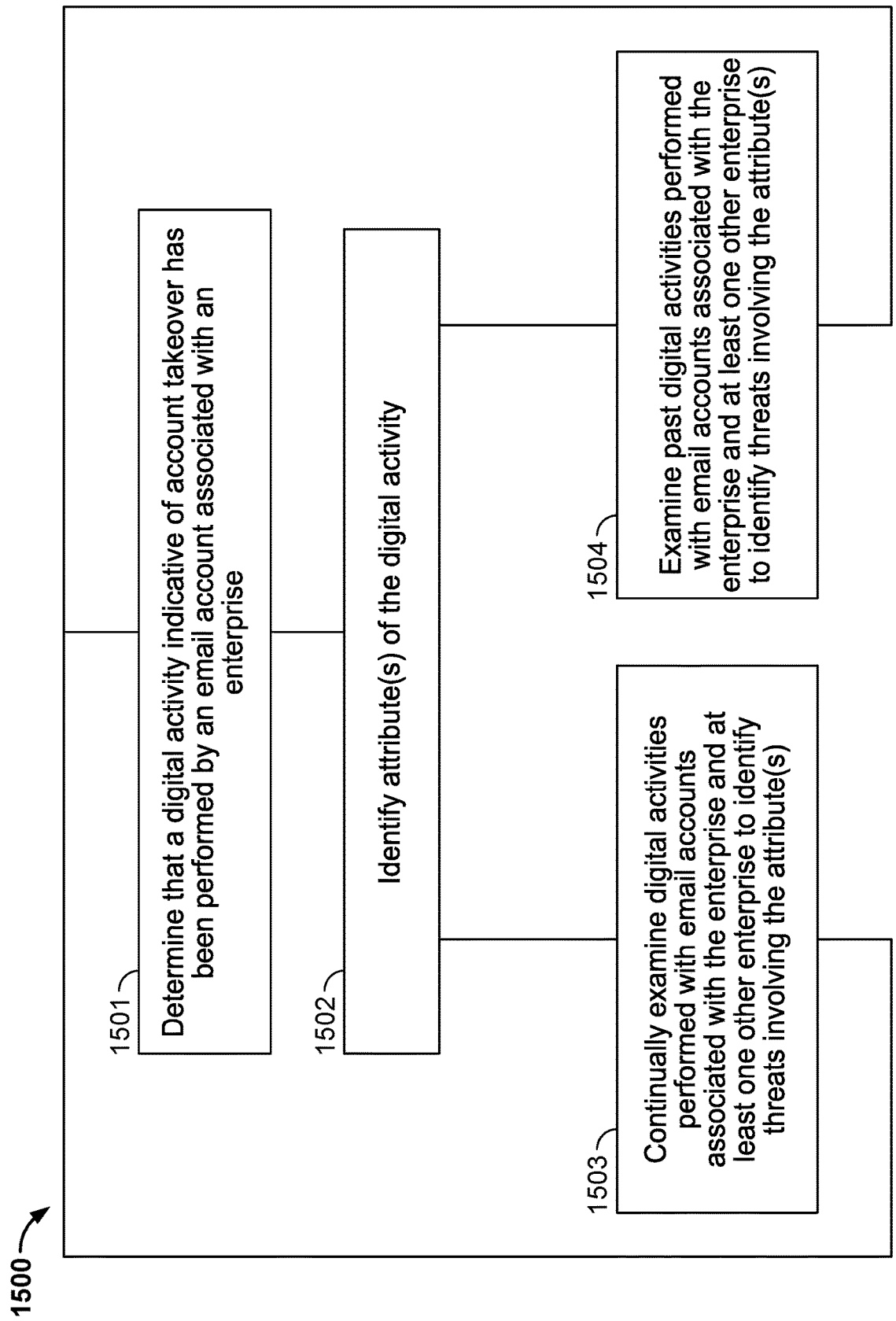
FIG. 15 depicts a flow diagram of a process for cross-checking Internet Protocol (IP) addresses against digital activities performed with email addresses associated with multiple enterprises to identify account takeover activities.

FIG. 15 depicts a flow diagram of a process 1500 for cross-checking IP addresses against digital activities performed with email addresses associated with multiple enterprises to identify account takeover activities. Initially, a threat detection platform determines that a digital activity indicative of account takeover has been performed by an email account (step 1501). The digital activity may be referred to as the "account takeover activity." Such action may be the result of the processes described with reference to FIGS. 11-12, for example. Said another way, the threat detection platform may identify the account takeover activity based on an analysis of digital activities performed with the email account.

Then, the threat detection platform can identify one or more attributes of the digital activity (step 1502). For example, the threat detection platform may identify the IP address that identifies the electronic device with which the account takeover activity was performed. Other examples of attributes include the geographical origin, sender identity, sender email address, recipient identity, recipient email address, etc. In some embodiments, the threat detection platform maintains a data structure that identifies these attribute(s) as well as the information regarding the account takeover activities, such as the time at which the corresponding digital activity was performed.

Thereafter, the threat detection platform can perform forward or backward detection as discussed above. In embodiments where the threat detection platform is configured to perform forward detection, the threat detection platform can continually examine digital activities performed with email accounts to identify threats involving the attribute (e.g., the IP address) in real time (step 1503). In embodiments where the threat detection platform is configured to perform backward detection, the threat detection platform can examine past digital activities performed with email accounts over a preceding interval of time to identify threats involving the attribute (e.g., the IP address) (step 1504). These email accounts may be associated with multiple enterprises, including the enterprise associated with the email account deemed to have been taken over. Thus, the threat detection platform may seek to identify threats to multiple enterprises based on knowledge gained from a single enterprise.

Aspects of the process 1500 could be performed continually or periodically. As one example, forward detection (i.e., step 1503) may be performed whenever account takeover activity is discovered, while backward detection (i.e., step 1504) may be performed on a daily or weekly basis given the higher amount of processing resources that is necessary. Moreover, aspects of the process 1500 could be performed in phases based on, for example, the level of threat detection that is desired or the amount of processing resources that is available. As an example, the threat detection platform may perform backward detection on a smaller set of digital activities (e.g., those performed in the last day) responsive to discovering the account takeover activity and then perform backward detection on a larger set of digital activities (e.g., those performed in the last month) on a daily basis.

While the threat detection platform is usually programmed to examine digital activities performed over intervals of time of fixed length, this need not always be the case. Assume, for example, that upon discovering a digital activity that indicates account takeover has occurred, the threat detection platform is programmed to examine digital activities performed with email accounts over the past 14 days. Upon discovering another digital activity involving the same attribute (e.g., IP address), the threat detection platform may increase the time over which digital activities are examined. For instance, the threat detection platform may be programmed to examine digital activities that occurred in the 7 days preceding the first instance of account takeover activity. Thus, if the threat detection platform discovers that another digital activity involving the same attribute occurred 12 days ago, then the threat detection platform may examine digital activities occurring within the last 19 days.

Expanded Detection Through Analysis of Login Events

Some embodiments of the threat detection platform rely on third-party services to discover security-related events. For example, a threat detection platform may obtain (e.g., via an API) information regarding security-related events involving email addresses associated with an enterprise from Microsoft Windows® Security Log. Using this information, the threat detection platform can determine whether any of those email addresses have been compromised. This information may not be readily available for all enterprises, however. As such, the threat detection platform may need to rely on other forms of data in some scenarios.

Generally, the threat detection platform is still able to obtain data regarding sign-in events for those enterprises for which security-related events are not available. Accordingly, the threat detection platform may be programmed and/or trained to identify the same sign-in events in this data that would otherwise be flagged by Microsoft Windows Security Log. At a high level, the threat detection platform can emulate aspects of Microsoft Windows Security Log, thereby decreasing its reliance on those security-related events while increasing knowledge of why, exactly, some sign-in events have been flagged as concerning.

Figure 16:
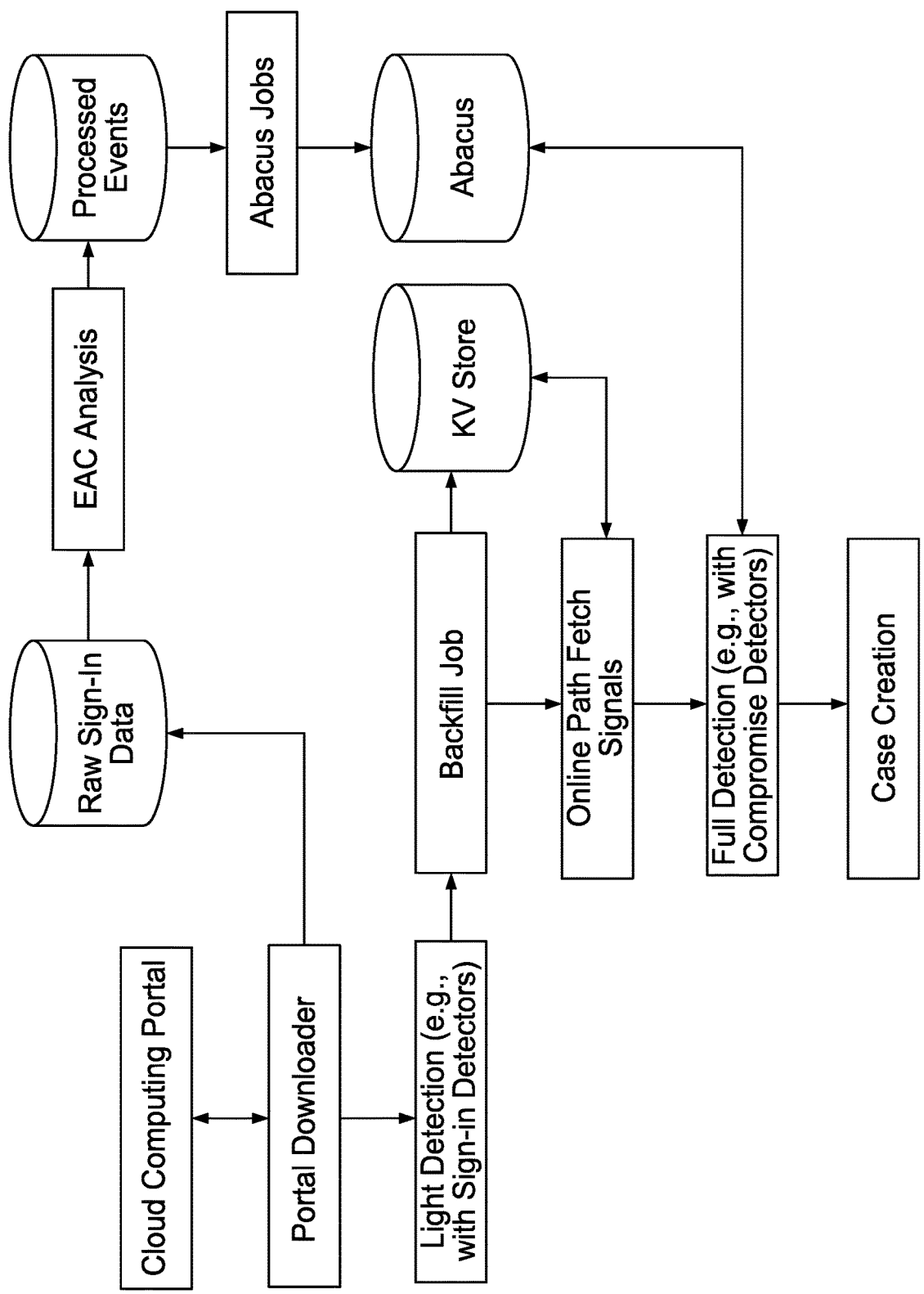
FIG. 16 depicts a high-level flow diagram of a process in which a threat detection platform can identify potential instances of compromise based on an analysis of sign-in events performed with email accounts.

FIG. 16 depicts a high-level flow diagram of a process in which a threat detection platform can identify potential instances of compromise based on an analysis of sign-in events performed with email accounts. With only data related to sign-in events, the threat detection platform is still able to:

Identify unfamiliar features such as IP addresses, geographical locations, electronic device identifiers, computer program (e.g., mobile application or web browser) identifiers, and the like;

Identify IP addresses known to represent a security risk;

Identify suspicious changes in the location of sign-in events (e.g., those for which travel is an unlikely or impossible explanation); and Identify unusual sign-in events through legacy computer programs.

As shown in FIG. 16, a portal downloader ingests new sign-in events from a cloud computing portal. This may be done periodically (e.g., on a regular, consistent basis) or continually (e.g., as sign-in events occur). These sign-in events can then be saved in a storage medium in the form of raw data for the purpose of improving detection. In addition, each sign-in event may go through light detection so as to create a first risk score that is indicative of the threat level. If a sign-in event is found to have a first risk score that exceeds a predetermined threshold, secondary detection (also referred to as "full detection") can be triggered. Sign-in events requiring further analysis may be collected and then saved into a key/value (KV) store for subsequent retrieval.

Thereafter, those sign-in events can be collected by the threat detection platform and then subjected to full detection so as to establish a second risk score. If this second risk score exceeds another predetermined threshold, then the threat detection platform may create a case. The term "case," as used herein, may refer to an instance of compromise discovered by the threat detection platform.

This process involves two stages of analysis, light detection and full detection. During the light detection stage, the threat detection platform can filter down the email accounts for which it would like to execute the downstream detection pipeline. The threat detection platform will normally only flag email accounts involved in suspicious sign-in events. Several examples of suspicious sign-in events are further described below:

Unfamiliar Features: Sign-in events that have one or more unusual attributes may be flagged as suspicious. Each sign-in event can be defined based on IP address, geographical location, web browser identifier, mobile application identifier, operating system, authentication method, trust level of the computing device used to perform the sign-in event, compliance status of the computing device used to perform the sign-in event, failure reason if sign-in event was unsuccessful, multi-factor authentication status (e.g., whether authentication was successful, the reason for failure), or any combination thereof. Those skilled in the art will recognize that sign-in events could be defined using some or all of these attributes. For example, in some embodiments, each sign-in event is defined using a collection of five main attributes: (1) IP address, (2) geographical location, (3) web browser identified, (4) mobile application identifier, and (5) operating system. To simplify the analysis, the threat detection platform may divide these attributes into two groups, a location group comprised of the IP address and geographical location and a user group (also referred to as an "agent group") comprised of the web browser identifier, mobile application identifier, and operating system. One of these groups may be considered unusual if any individual attribute is unexpected given past sign-in events performed by the same email account. However, the threat detection platform may only flag the sign-in event as suspicious if both groups are considered unusual. Such an approach ensures that the threat detection platform can capture behavior of an attacker that is likely in a different location than the true owner and using a different electronic device, while ignoring behavior like owners switching electronic devices or bringing electronic devices to a new location.

Risky IP Address: Sign-in events that involve IP addresses deemed to be risky may be flagged as suspicious. Those IP addresses may be maintained on a blacklist managed by the threat detection platform, or the threat detection platform may establish the "riskiness" of an IP address through analysis of IPQualityScore (IPQS) and Classless Inter-Domain Routing (CIDR) information.

Unlikely Travel: Sign-in events that are indicative of unlikely or impossible travel may be flagged as suspicious. The threat detection platform can accomplish this in several different ways. First, the threat detection platform can flag a sign-in event as suspicious if it occurs in a high-risk country and is preceded by sign-in events in a low-risk country. The threat detection platform may maintain a list of high-risk countries that is generated and/or updated based on the geographical locations of threats it has discovered. Second, the threat detection platform can flag a sign-in event as suspicious if travel to its geographical location would be difficult or impossible given the geographical location of a preceding sign-in event. As an example, the threat detection platform may determine that a sign-in event is suspicious if it occurs in Russia while the preceding sign-in event occurred several hours earlier in the United States.

Unusual Legacy Application Detection: Sign-in events that occur through legacy versions of a mobile application or desktop application may be flagged as suspicious. To facilitate the discovery of these sign-in events, the threat detection platform may be integrated with a service (e.g., Abacus) designed to count the number of sign-in events that occur through legacy applications.

Thus, in some situations the threat detection platform may determine risk based on analysis of a single sign-in event, while in other situations the threat detection platform may determine risk based on analysis of multiple sign-in events (e.g., by determining how a sign-in event compares to one or more preceding sign-in events).

Generally, the threat detection platform operates in an "online mode," in which sign-in events are examined and then classified in near real time. In FIG. 16, for example, the threat detection platform may perform light detection in real time as sign-in events occur (e.g., to determine whether access to an enterprise network should be permitted) and then subsequently perform full detection as time and resources permit. The threat detection platform may perform full detection regardless of whether a given sign-in event survives light detection, though full detection may be expedited if the given sign-in event does not survive light detection (in which case the email account may be prevented from performing certain actions until a final determination on compromise has been made). However, given the amount of uncertainty involved - especially when training data related to past sign-in events is limited, some enterprises may prefer that the threat detection platform operate in an "offline mode." In offline mode, the threat detection platform determines the likelihood of compromise for each sign-in event but may not immediately flag any sign-in events as suspicious. Instead, the threat detection platform may maintain a list of suspicious sign-in events for further analysis (e.g., by an individual or another security product).

Note that the raw data regarding sign-in events may be regularly processed by the threat detection platform (e.g., in the context of analyzing potential instances of employee account compromise) and then fed into a service (here, Abacus) to learn the normal behavior of email accounts. Such an approach enables the threat detection platform to build a behavioral profile (or simply "profile") for each email account, which in turn allows abnormal digital activities (or patterns of digital activities) performed with an email account to be more easily discovered due to noncompliance with the corresponding profile.

Figure 17:
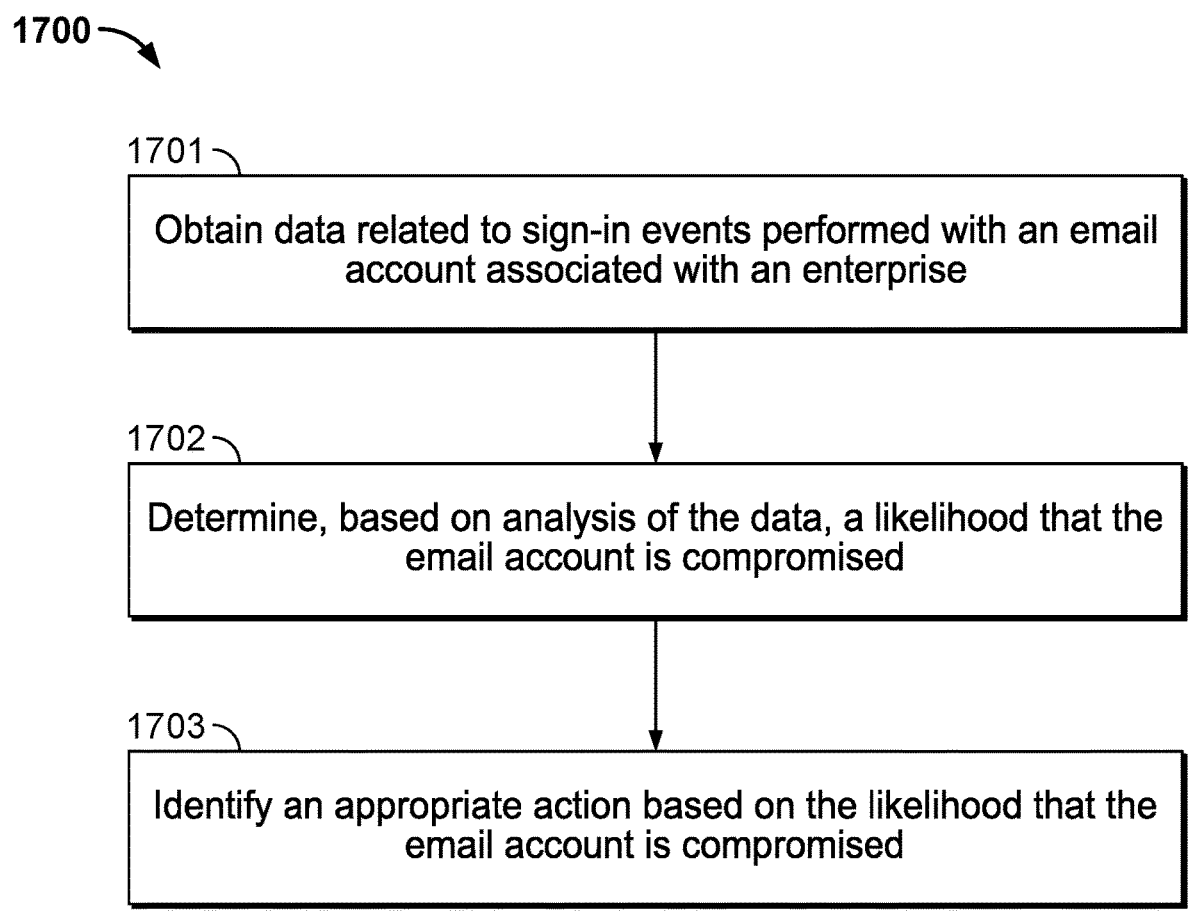
FIG. 17 depicts a flow diagram of a process for discovering instances of email account compromise through analysis of sign-in events.

FIG. 17 depicts a flow diagram of a process 1700 for discovering instances of email account compromise through analysis of sign-in events. As discussed above, this process 1700 may be performed in combination with others described herein, or this process 1700 may be performed on its own. Said another way, some embodiments of the threat detection platform may be configured to discover instances of email account compromise solely through analysis of sign-in events.

Initially, the threat detection platform can obtain data related to sign-in events performed with an email account associated with an enterprise (step 1701). As discussed above with reference to FIG. 4, this data may be obtained from the enterprise or retrieved from an external database managed by some other entity.

Then, the threat detection platform can determine, based on analysis of the data, a likelihood that the email account is compromised (step 1702). In determining the likelihood of compromise, the threat detection platform can examine several aspects of the sign-in events as discussed above. As an example, the threat detection platform may determine whether any sign-in events have one or more unusual attributes given the attributes (or combination of attributes) associated with past sign-in events. As another example, the threat detection platform may determine whether any sign-in events deviate from the pattern of geographical locations associated with past sign-in events. For instance, the threat detection platform may flag a sign-in event as suspicious if it occurs in a high-risk country and is preceded by one or more sign-in events in a low-risk country, or the threat detection platform may flag a sign-in event as suspicious if travel to its geographical location would be difficult or impossible given the geographical location of a preceding sign-in event.

Moreover, the threat detection platform may identify an appropriate action based on the likelihood that the email account is compromised (step 1703). If the threat detection platform determines that the likelihood of compromise is low, then no further action may be taken. Said another way, the email account may be permitted to access the enterprise network without restriction. However, if the threat detection platform determines that the likelihood of compromise is high, then action(s) may be taken to restrict access to the enterprise network, limit accessibility of the email account, etc. For example, the threat detection platform may prompt the true owner of the email account to create new credentials and/or confirm that the sign-in event was legitimate (e.g., via two-factor authentication).

In some embodiments, the threat detection platform is configured to take different actions depending on the likelihood or threat of compromise. Assume, for example, that the threat detection platform determines there is a low to moderate likelihood of compromise due to a sign-in event occurring at an unusual time or geographical location. Rather than restrict the email account in this situation, the threat detection platform may instead identify the email account as a candidate for ongoing monitoring. Additionally or alternatively, the threat detection platform may notify the true owner of the email account that an unusual sign-in event was detected. Further restrictions may be placed on the email account responsive to determining that the likelihood of compromise has increased (e.g., due to additional unusual sign-in events).

Methodologies for Accurate Scoring

Figure 18:
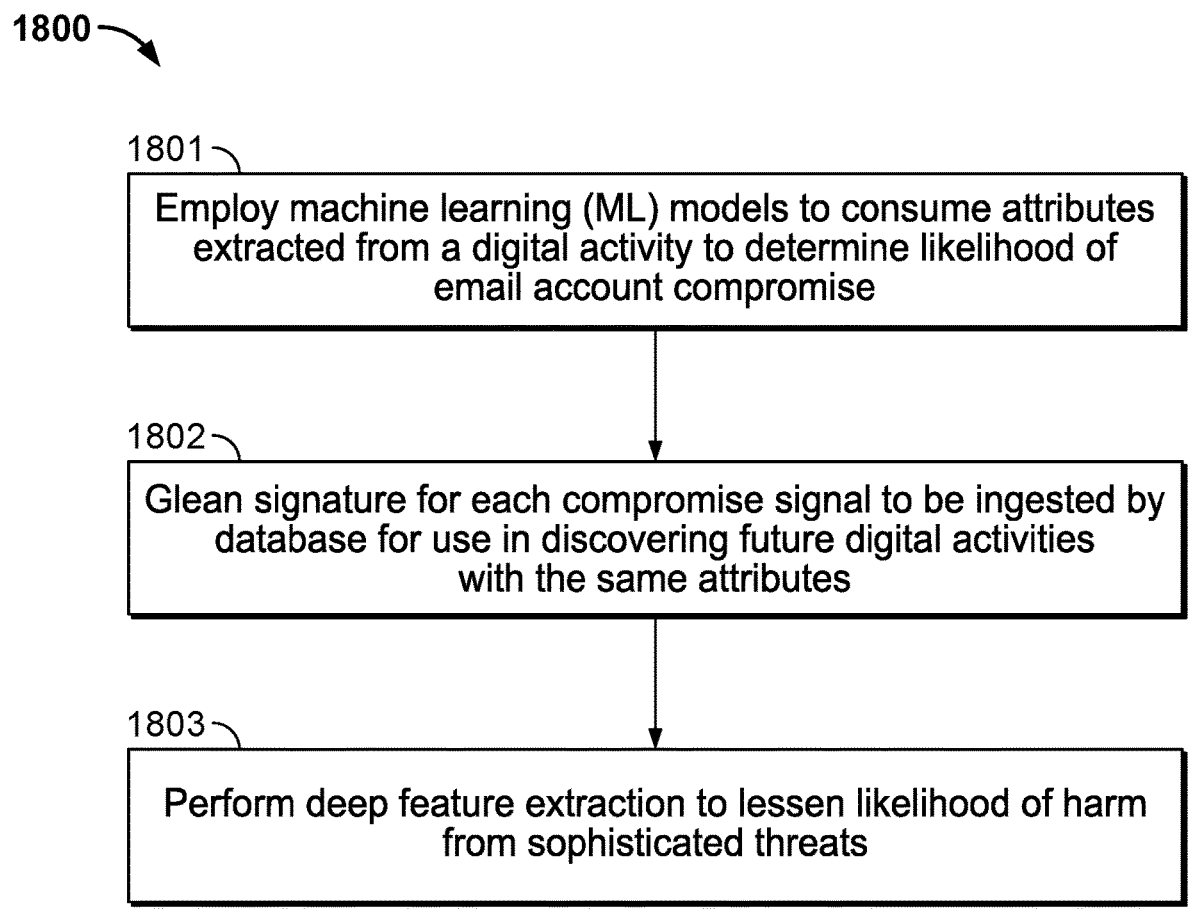
FIG. 18 depicts a high-level flow diagram of a process for scoring the threat posed by a digital activity, such as the transmission of an outgoing email.

The term "accurate scoring" covers a combination of several concepts further discussed above. FIG. 18 depicts a high-level flow diagram of a process 1800 for scoring the threat posed by a digital activity, such as the transmission of an outgoing email.

First, a threat detection platform may employ one or more ML models, such as deep learning models, to consume the attributes that have been extracted for a digital activity to determine the likelihood of email account compromise (step 1801). Collectively, these ML model(s) may be referred to as the "ML detector." In some embodiments, a real-time proportional-integral-derivative (PID) controller is used to tune the threshold for each enterprise (or each employee) whose emails are being monitored to take into consideration the changing landscape of attack types, email content, etc. The thresholds ensure that the ML model(s) have high precision and continue to be highly precise over time. To cover the general attack landscape, the threat management platform may employ a combination of federated ML models, enterprise-specific ML models, and employee-specific ML models able to capture the nuances of sophisticated attacks (e.g., phishing attacks in internal emails generated by compromised email accounts).

Second, the threat detection platform can glean the signatures of compromise signals in real time to determine the nature of any security threats identified by the ML detector (step 1802). Examples of compromise signals include IP addresses, email addresses, URLs, domains, cryptocurrency addresses, etc. For zero-hour attacks, the compromise signals can be extracted as the digital activities are identified, processed, and classified by the ML detector. These compromise signals can be automatically ingested into a database as "signatures" in real time. Thereafter, the signatures can be used in conjunction with the ML detector to discover future digital activities with the same attributes.

Third, the threat detection platform can perform deep feature extraction to identify zero-hour attacks (step 1803). Identifying zero-hour attacks requires deeper content analysis to understand the nuances of possible attacks. For example, deep learning sub-model(s) may be applied to understand the text, content, sentiment, and/or tone of an email. As another example, to find phishing pages, computer vision may be used to compare the landing page of a link embedded in an email to a set of known sign-on pages. As another example, webpage crawling may be performed to extract information regarding a deep link (e.g., a link embedded in an attachment or a link accessible on a linked website) to discover instances of deep phishing.

Processing System

Figure 19:
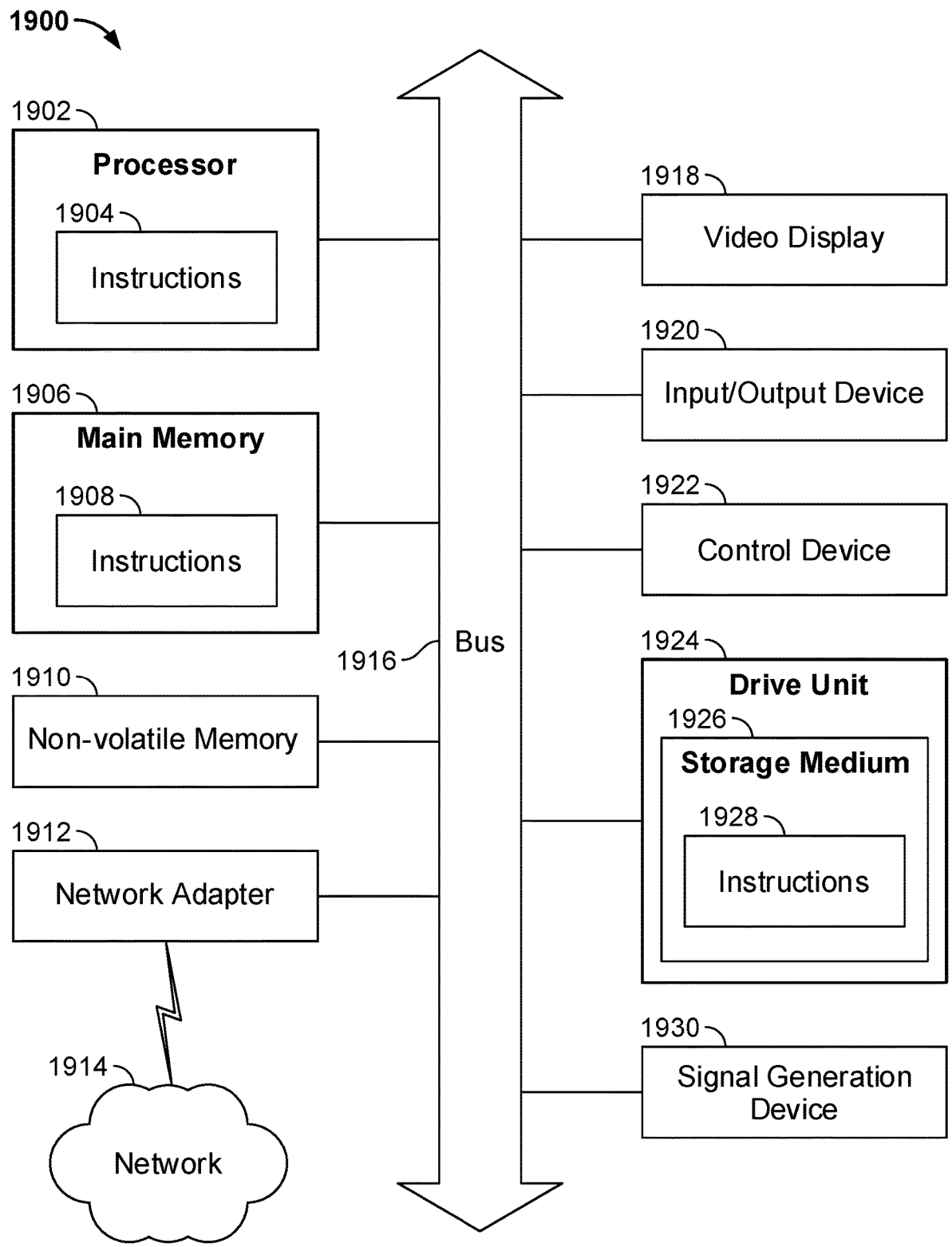
FIG. 19 is a block diagram illustrating an example of a processing system in which at least some operations described herein can be implemented.

FIG. 19 is a block diagram illustrating an example of a processing system 1900 in which at least some operations described herein can be implemented. For example, some components of the processing system 1900 may be hosted on a computing device that includes a threat detection platform (e.g., threat detection platform 200 of FIG. 2). As another example, some components of the processing system 1900 may be hosted on a computing device that is queried by a threat detection platform to acquire emails, data, etc.

The processing system 1900 may include one or more central processing units ("processors") 1902, main memory 1906, non-volatile memory 1910, network adapter 1912 (e.g., network interface), video display 1918, input/output devices 1920, control device 1922 (e.g., keyboard and pointing devices), drive unit 1924 including a storage medium 1926, and signal generation device 1930 that are communicatively connected to a bus 1916. The bus 1916 is illustrated as an abstraction that represents one or more physical buses and/or point-to-point connections that are connected by appropriate bridges, adapters, or controllers. The bus 1916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1900.

While the main memory 1906, non-volatile memory 1910, and storage medium 1926 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 1928. The terms "machine-readable medium" and "storage medium" shall also be taken to include any medium that is capable of storing, encoding, or carrying a set of instructions for execution by the processing system 1900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1904, 1908, 1928) set at various times in various memory and storage devices in a computing device. When read and executed by the processor(s) 1902, the instruction(s) cause the processing system 1900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 1910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1912 enables the processing system 1900 to mediate data in a network 1914 with an entity that is external to the processing system 1900 through any communication protocol supported by the processing system 1900 and the external entity. The network adapter 1912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

EXAMPLES

Several aspects of the disclosure are set forth in the following examples. Note that, unless noted otherwise, all of these examples can be combined with one another. Accordingly, while a feature may be described in the context of a given example, the feature may be similarly applicable to another example.

1. A method for determining the likelihood that an email account belonging to an employee has been compromised, the method comprising:
   obtaining first data associated with a series of past digital activities performed with an email account associated with an employee of an enterprise;
   parsing the first data to discover an attribute of each past digital activity in the series of past digital activities;
   generating a behavior profile for the email account by creating a separate entry for each past digital activity in the series of past digital activities that specifies the corresponding attribute;
   obtaining second data associated with a digital activity performed with the email account;
   parsing the second data to discover an attribute of the digital activity;
   producing a deviation metric by programmatically comparing the attribute of the digital activity to the behavior profile; and
   generating an output that specifies a likelihood that the email account is compromised based on the deviation metric.

2. The method of example 1, wherein the series of past digital activities includes receptions of incoming emails, transmissions of outgoing emails, creations of mail filters, occurrences of sign-in events, or any combination thereof.

3. The method of example 1, wherein said producing comprises programmatically comparing the attribute of the digital activity to each entry in the behavior profile that corresponds to a same type of digital activity.

4. The method of example 1, wherein said obtaining the first data comprises:
   establishing, via an application programming interface, a connection with a storage medium that includes the first data, and
   downloading, via the application programming interface, the first data into a processing environment.

5. The method of example 1, wherein said producing comprises:
   establishing whether the attribute of the digital activity deviates from the attribute corresponding to each past digital activity in the series of past digital activities, and
   providing any deviations to a machine learning model that produces the deviation metric as output.

6. The method of example 1, further comprising:
   examining the first data to identify information related to each past digital activity in the series of past digital activities; and
   defining each past digital activity as a separate event by populating a predefined schema with the corresponding information identified in the first data.

7. The method of example 1, further comprising:
   determining an appropriate remediation action based on the output and/or the deviation metric.

8. The method of example 7, further comprising:
   classifying the digital activity as being indicative of a type of compromise scheme;
   wherein the appropriate remediation action is based on the type of compromise scheme.

9. A non-transitory computer-readable medium with instructions stored thereon that, when executed by a processor, cause the processor to perform operations comprising:
   obtaining first data related to past digital activities performed with an email account associated with an employee of an enterprise,
      wherein the first data includes information concerning—
         sign-in events involving the email account, and
         emails generated by the email account;
   generating a behavior profile for the email account based on the first data;
   obtaining second data related to a digital activity performed with the email account; and
   generating a risk metric indicative of the likelihood that the email account is compromised that is based on a similarity between the second data and the behavior profile.

10. The non-transitory computer-readable medium of example 9, wherein the second data is obtained in real time as the digital activity is being performed.

11. The non-transitory computer-readable medium of example 9, wherein the first data further includes information concerning—
   mail filters created by the email account.

12. The non-transitory computer-readable medium of example 9,
   wherein the first data includes multiple types of information stored in multiple storage mediums, and
   wherein said obtaining the first data comprises:
      establishing a connection with each storage medium of the multiple storage mediums via a corresponding application programming interface, and
      causing a subset of the first data to be downloaded from each storage medium of the multiple storage mediums via the corresponding application programming interface.

13. The non-transitory computer-readable medium of example 9, the operations further comprising:
   comparing the risk metric to a series of thresholds representative of different levels of risk to the enterprise; and
   identifying a remediation action to be performed based on said comparing.

14. A method comprising:
   collecting data related to outgoing emails sent by an email account over a past interval of time;
   generating a behavior profile for the email account by—
      deriving at least one attribute of each outgoing email from the data, and
      populating a data structure that represents the behavior profile with the derived attributes;
   acquiring an outgoing email sent by the email account prior to receipt by an intended recipient;

deriving one or more attributes of the outgoing email by examining the outgoing email and metadata associated with the outgoing email; and determining whether the outgoing email deviates from the behavior profile for the email account by programmatically comparing the one or more attributes to the data structure.

15. The method of example 14, further comprising:

identifying the email account as possibly being compromised responsive to a determination that the outgoing email does deviate from the behavior profile for the email account.

16. The method of example 14, further comprising:

forwarding the outgoing email to a mail server for transmission to the intended recipient via the Internet responsive to a determination that the outgoing email does not deviate from the behavior profile for the email account.

17. The method of example 14, further comprising:

forwarding the outgoing email to a corporate mail system for transmission to the intended recipient responsive to a determination that the outgoing email does not deviate from the behavior profile for the email account.

18. The method of example 14, wherein the data specifies content of each outgoing email, a time at which each outgoing email was sent, and a geographical location from which each outgoing email was sent.

19. The method of example 18, wherein the geographical location is determined based on an Internet Protocol (IP) address assigned to an electronic device through which the email account is accessed when the corresponding outgoing email is sent.

20. The method of example 15, further comprising:

causing an administrator to be notified that the email account is possibly compromised.

21. The method of example 20, wherein the email account is associated with an employee of an enterprise, and wherein the administrator is associated with the enterprise.

22. The method of example 20, wherein the email account is associated with an employee of an enterprise, and wherein the administrator is associated with a security service employed by the enterprise.

23. The method of example 20, further comprising:

enabling the administrator to manually address a threat posed by the email account.

24. The method of example 20, further comprising:

performing a remediation action to address a threat posed by the email account on behalf of the administrator.

25. A method comprising:

obtaining first data associated with a series of past digital activities performed with an email account;

parsing the first data to discover an attribute of each past digital activity in the series of past digital activities;

generating a behavior profile for the email account by creating, in a data structure, a separate entry for each past digital activity in the series of past digital activities that specifies the corresponding attribute;

obtaining second data associated with a digital activity performed with the email account;

parsing the second data to discover an attribute of the digital activity; and determining a likelihood that the email account is compromised by comparing the attribute of the digital activity to the behavior profile.

26. The method of example 25, wherein the series of past digital activities includes receptions of incoming emails, transmissions of outgoing emails, creations of mail filters, occurrences of sign-in events, or any combination thereof.

27. The method of example 25, wherein the attribute is an Internet Protocol (IP) address that identifies an electronic device with which the digital activity is performed.

28. The method of example 27, further comprising:

generating an output that specifies a high likelihood of compromise responsive to a determination that the IP address identified for the digital activity does not match any entries in the behavior profile.

29. The method of example 25, wherein said determining comprises:

producing a deviation metric by programmatically comparing the attribute of the digital activity to the behavior profile, wherein the likelihood that the email account is compromised is based on the deviation metric.

30. The method of example 25, further comprising:

determining an appropriate remediation action based on the likelihood that the email account is compromised.

31. The method of example 30, wherein when a high likelihood of compromise exists, the appropriate remediation action includes prohibiting the email account from performing digital activities, and wherein when a low likelihood of compromise exists, the appropriate remediation action includes further monitoring digital activities performed with the email account.

32. A non-transitory computer-readable medium with instructions stored thereon that, when, executed by a processor, cause the processor to perform operations comprising:

determining that an email account associated with an enterprise has been compromised based on an analysis of a digital activity performed with the email account;

identifying an attribute of the digital activity performed with the email account; and examining, on a continual basis, digital activities performed with email accounts associated with the enterprise and at least one other enterprise to identify threats involving the attribute in real time.

33. The non-transitory computer-readable medium of example 32, wherein the attribute is an Internet Protocol (IP) address that identifies an electronic device with which the digital activity is performed.

34. The non-transitory computer-readable medium of example 32, wherein the operations further comprise:

for each of the digital activities, generating a signature that specifies one or more attributes that collectively identify the digital activity.

35. The non-transitory computer-readable medium of example 34, wherein said examining includes comparing each signature to the attribute to identify digital activities whose signatures include the attribute.

36. A non-transitory computer-readable medium with instructions stored thereon that, when, executed by a processor, cause the processor to perform operations comprising:

determining that an email account associated with an enterprise has been compromised based on an analysis of a digital activity performed with the email account;

identifying an attribute of the digital activity performed with the email account; and examining past digital activities performed with email accounts associated with the enterprise and at least one other enterprise to identify threats involving the attribute, wherein the past digital activities correspond to a preceding interval of time of predetermined length.

37. The non-transitory computer-readable medium of example 36, wherein the attribute is an Internet Protocol (IP) address that identifies an electronic device with which the digital activity is performed.

38. The non-transitory computer-readable medium of example 36, wherein said examining is performed on a periodic basis.

39. A method comprising:
obtaining data related to sign-in events performed with an email account associated with an employee of an enterprise;
determining, based on analysis of the data, a likelihood that the email account is compromised; and
identifying an appropriate action based on the likelihood that the email account is compromised.

40. The method of example 39, wherein said determining comprises:
for each of the sign-in events,
identifying (i) a first attribute representative of a user of the email account and (ii) a second attribute representative of a geographical location of the user, and
classifying a given sign-in event as indicative of compromise responsive to a determination that the first and second attributes of the given sign-in event are dissimilar from the first and second attributes of a preceding sign-in event, thereby indicating that the user is not the employee.

41. The method of example 39, wherein said determining comprises:
for each of the sign-in events,
identifying an Internet Protocol (IP) address that identifies an electronic device with which the sign-in event was performed, and
classifying a given sign-in event as indicative of compromise responsive to a determination that the corresponding IP address was previously deemed risky.

42. The method of example 39, wherein said determining comprises:
for each of the sign-in events,
identifying a geographical location where the sign-in event was performed, and
classifying a given sign-in event as indicative of compromise responsive to a determination that the corresponding geographical location is associated with a country that was previously deemed risky.

43. The method of example 39, wherein said determining comprises:
for each of the sign-in events,
identifying a geographical location where the sign-in event was performed, and
classifying a given sign-in event as indicative of compromise responsive to a determination that travel to the corresponding geographical location is improbable or impossible given the geographical location of a preceding sign-in event.

44. The method of example 39, wherein said determining comprises:
classifying a given sign-in event as indicative of compromise responsive to a determination that the given sign-in event occurred through a legacy version of a computer program through which a network associated with the enterprise is accessible.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method, comprising:
obtaining first data associated with a series of past digital communication activities performed with an email account, wherein each digital communication activity included in the series involves at least one of a reception or a transmission of a communication;
parsing the first data to discover an attribute of each past digital communication activity in the series of past digital communication activities;
generating a behavior profile for the email account by creating, in a data structure, a separate entry for each past digital communication activity in the series of past digital communication activities that specifies the corresponding attribute, wherein entries in the behavior profile are in a temporal order so as to ensure that deviations in behavior of the email account are detectable;
obtaining second data associated with a digital communication activity performed with the email account;
determining, based on an analysis of the second data, that the communication includes a link to a website and employing computer vision to compare the website to a set of known sign- on pages verified as authentic;
parsing the second data to discover an attribute of the digital communication activity;
producing a deviation metric by programmatically comparing the attribute of the digital communication activity to the behavior profile; and
determining, based on the deviation metric and also based on whether the website matches any of the known sign-on pages in the set, a likelihood that the email account is compromised.

2. The method of claim 1, wherein the series of past digital communication activities includes receptions of incoming emails and transmissions of outgoing emails.

3. The method of claim 1, wherein the attribute is an Internet Protocol (IP) address that identifies an electronic device with which the digital communication activity is performed.

4. The method of claim 3, further comprising: generating an output that specifies a high likelihood of compromise responsive to a determination that the IP address identified for the digital communication activity does not match any entries in the behavior profile.

5. The method of claim 1, further comprising: determining an appropriate remediation action based on the likelihood that the email account is compromised.

6. The method of claim 5,
wherein when a high likelihood of compromise exists, the appropriate remediation action includes prohibiting the email account from performing digital communication activities, and
wherein when a low likelihood of compromise exists, the appropriate remediation action includes further monitoring digital communication activities performed with the email account.

7. The method of claim 5, wherein the appropriate remediation action is based on (i) a level of confidence in the likelihood, (ii) a type of the digital communication activity, or (iii) a threat posed if the email account is compromised.

8. The method of claim 5, wherein the appropriate remediation action includes moving all emails generated by the email account over an interval of time into a dedicated folder for further analysis.

9. The method of claim 1, further comprising:
acquiring a machine learning (ML) model that is trained using past communications generated by the email account to understand normal communication behavior of the email account; and
applying the ML model to the second data so as to establish a degree to which content of a communication involved in the digital communication activity deviates from the normal communication behavior of the email account.

10. A method, comprising:
obtaining first data associated with a series of past digital communication activities performed with an email account, wherein each digital communication activity included in the series involves at least one of a reception or a transmission of a communication;
parsing the first data to discover an attribute of each past digital communication activity in the series of past digital communication activities;
generating a behavior profile for the email account by creating, in a data structure, a separate entry for each past digital communication activity in the series of past digital communication activities that specifies the corresponding attribute, wherein entries in the behavior profile are in a temporal order so as to ensure that deviations in behavior of the email account are detectable;
obtaining second data associated with a digital communication activity performed with the email account
determining, based on an analysis of the second data, that the communication includes a link to a website and indexing content of the website to establish whether the communication represents an instance of phishing;
parsing the second data to discover an attribute of the digital communication activity;
producing a deviation metric by programmatically comparing the attribute of the digital communication activity to the behavior profile; and
determining, based on the deviation metric and also based on whether the communication is determined to represent an instance of phishing, a likelihood that the email account is compromised.

11. The method of claim 10, wherein the series of past digital communication activities includes receptions of incoming emails and transmissions of outgoing emails.

12. The method of claim 10, wherein the attribute is an Internet Protocol (IP) address that identifies an electronic device with which the digital communication activity is performed.

13. The method of claim 12, further comprising: generating an output that specifies a high likelihood of compromise responsive to a determination that the IP address identified for the digital communication activity does not match any entries in the behavior profile.

14. The method of claim 10, further comprising: determining an appropriate remediation action based on the likelihood that the email account is compromised.

15. The method of claim 14,
wherein when a high likelihood of compromise exists, the appropriate remediation action includes prohibiting the email account from performing digital communication activities, and
wherein when a low likelihood of compromise exists, the appropriate remediation action includes further monitoring digital communication activities performed with the email account.

16. The method of claim 14, wherein the appropriate remediation action is based on (i) a level of confidence in the likelihood, (ii) a type of the digital communication activity, or (iii) a threat posed if the email account is compromised.

17. The method of claim 14, wherein the appropriate remediation action includes moving all emails generated by the email account over an interval of time into a dedicated folder for further analysis.

18. The method of claim 10, further comprising:
acquiring a machine learning (ML) model that is trained using past communications generated by the email account to understand normal communication behavior of the email account; and
applying the ML model to the second data so as to establish a degree to which content of a communication involved in the digital communication activity deviates from the normal communication behavior of the email account.

19. A system, comprising:
a processor configured to:
obtain first data associated with a series of past digital communication activities performed with an email account, wherein each digital communication activity included in the series involves at least one of a reception or a transmission of a communication;
parse the first data to discover an attribute of each past digital communication activity in the series of past digital communication activities;
generate a behavior profile for the email account by creating, in a data structure, a separate entry for each past digital communication activity in the series of past digital communication activities that specifies the corresponding attribute, wherein entries in the behavior profile are in a temporal order so as to ensure that deviations in behavior of the email account are detectable;

obtain second data associated with a digital communication activity performed with the email account;
determine, based on an analysis of the second data, that the communication includes a link to a website and employ computer vision to compare the website to a set of known sign-on pages verified as authentic;
parse the second data to discover an attribute of the digital communication activity;
produce a deviation metric by programmatically comparing the attribute of the digital communication activity to the behavior profile; and
determine, based on the deviation metric and also based on whether the website matches any of the known sign-on pages in the set, a likelihood that the email account is compromised; and
a memory coupled to the processor and configured to provide the processor with instructions.

20. The system of claim 19, wherein the series of past digital communication activities includes receptions of incoming emails and transmissions of outgoing emails.

21. The system of claim 19, wherein the attribute is an Internet Protocol (IP) address that identifies an electronic device with which the digital communication activity is performed.

22. The system of claim 21, wherein the processor is further configured to: generate an output that specifies a high likelihood of compromise responsive to a determination that the IP address identified for the digital communication activity does not match any entries in the behavior profile.

23. The system of claim 19, wherein the processor is further configured to: determine an appropriate remediation action based on the likelihood that the email account is compromised.

24. The system of claim 23,
wherein when a high likelihood of compromise exists, the appropriate remediation action includes prohibiting the email account from performing digital communication activities, and
wherein when a low likelihood of compromise exists, the appropriate remediation action includes further monitoring digital communication activities performed with the email account.

25. The system of claim 23, wherein the appropriate remediation action is based on (i) a level of confidence in the likelihood, (ii) a type of the digital communication activity, or (iii) a threat posed if the email account is compromised.

26. The system of claim 23, wherein the appropriate remediation action includes moving all emails generated by the email account over an interval of time into a dedicated folder for further analysis.

27. The system of claim 19, wherein the processor is further configured to:
acquire a machine learning (ML) model that is trained using past communications generated by the email account to understand normal communication behavior of the email account; and
apply the ML model to the second data so as to establish a degree to which content of a communication involved in the digital communication activity deviates from the normal communication behavior of the email account.

28. A system, comprising:
a processor configured to:
obtain first data associated with a series of past digital communication activities performed with an email account, wherein each digital communication activity included in the series involves at least one of a reception or a transmission of a communication;
parse the first data to discover an attribute of each past digital communication activity in the series of past digital communication activities;
generate a behavior profile for the email account by creating, in a data structure, a separate entry for each past digital communication activity in the series of past digital communication activities that specifies the corresponding attribute, wherein entries in the behavior profile are in a temporal order so as to ensure that deviations in behavior of the email account are detectable;
obtain second data associated with a digital communication activity performed with the email account;
determine, based on an analysis of the second data, that the communication includes a link to a website and index content of the website to establish whether the communication represents an instance of phishing;
parse the second data to discover an attribute of the digital communication activity;
produce a deviation metric by programmatically comparing the attribute of the digital communication activity to the behavior profile; and
determine, based on the deviation metric and also based on whether the communication is determined to represent an instance of phishing, a likelihood that the email account is compromised; and
a memory coupled to the processor and configured to provide the processor with instructions.

29. The system of claim 28, wherein the series of past digital communication activities includes receptions of incoming emails and transmissions of outgoing emails.

30. The system of claim 28, wherein the attribute is an Internet Protocol (IP) address that identifies an electronic device with which the digital communication activity is performed.

31. The system of claim 30, wherein the processor is further configured to: generate an output that specifies a high likelihood of compromise responsive to a determination that the IP address identified for the digital communication activity does not match any entries in the behavior profile.

32. The system of claim 28, wherein the processor is further configured to: determine an appropriate remediation action based on the likelihood that the email account is compromised.

33. The system of claim 32,
wherein when a high likelihood of compromise exists, the appropriate remediation action includes prohibiting the email account from performing digital communication activities, and
wherein when a low likelihood of compromise exists, the appropriate remediation action includes further monitoring digital communication activities performed with the email account.

34. The system of claim 32, wherein the appropriate remediation action is based on (i) a level of confidence in the likelihood, (ii) a type of the digital communication activity, or (iii) a threat posed if the email account is compromised.

35. The system of claim 32, wherein the appropriate remediation action includes moving all emails generated by the email account over an interval of time into a dedicated folder for further analysis.

36. The system of claim 28, wherein the processor is further configured to:
acquire a machine learning (ML) model that is trained using past communications generated by the email account to understand normal communication behavior of the email account; and apply the ML model to the second data so as to establish a degree to which content of a communication involved in the digital communication activity deviates from the normal communication behavior of the email account.

* * * * *

UNITED STATES PATENT AND TRADEMARK OFFICE
CERTIFICATE OF CORRECTION

PATENT NO. : 11,470,042 B2
APPLICATION NO. : 17/094801
DATED : October 11, 2022
INVENTOR(S) : Dmitry Chechik et al.

It is certified that error appears in the above-identified patent and that said Letters Patent is hereby corrected as shown below:

On the Title Page

In page 2, item [56], Column 1, Line 20, delete "Mistratov" and insert --Mistratov et al.--, therefor.
In page 2, item [56], Column 2, Line 19, delete "Priess" and insert --Priess et al.--, therefor.
In page 2, item [56], Column 2, Line 27, delete "Abrams" and insert --Abrams et al.--, therefor.
In page 3, item [56], Column 1, Line 12, delete "Jeyakumar" and insert --Jeyakumar et al.--, therefor.

Signed and Sealed this
Thirteenth Day of June, 2023

*Katherine Kelly Vidal*

Katherine Kelly Vidal
*Director of the United States Patent and Trademark Office*